(12) United States Patent
Narasimhamurthy et al.

(10) Patent No.: US 9,588,985 B2
(45) Date of Patent: Mar. 7, 2017

(54) REDUCING BLOCKING INSTANCES IN PARALLEL PROCESSING SYSTEMS PERFORMING OPERATIONS ON TREES

(71) Applicant: Oracle International Corporation, Redwood Shores, CA (US)

(72) Inventors: Giridhar Narasimhamurthy, Bangalore (IN); Bharadwaj Raghavendra Gosukonda, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 333 days.

(21) Appl. No.: 14/246,159

(22) Filed: Apr. 7, 2014

(65) Prior Publication Data

US 2015/0286664 A1    Oct. 8, 2015

(51) Int. Cl.
*G06F 17/30*    (2006.01)

(52) U.S. Cl.
CPC .............................. *G06F 17/30224* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,893,086 | A * | 4/1999 | Schmuck | G06F 11/1435 |
| 6,868,414 | B2 * | 3/2005 | Khanna | G06F 17/30961 |
| 2002/0087564 | A1 * | 7/2002 | Khanna | G06F 17/30961 |
| 2011/0320496 | A1 | 12/2011 | Reid et al. | |

OTHER PUBLICATIONS

Nathan G. Bronson, Jared Casper, Hassan Chafi, Kunle Olukotun, A practical concurrent binary search tree, PPoPP '10 Proceedings of the 15th ACM SIGPLAN Symposium on Principles and Practice of Parallel Programming, date Jan. 2010, pp. 257-268, vol. 45 Issue 5, ACM New York, NY, USA.
Jong Ho Kim, Helen Cameron, Peter Graham, Lock-Free Red-Black Trees Using CAS, date Oct. 20, 2011, pp. 1-35.
Shane Valentine Howley, Lock-free internal binary search trees with memory Management, date Oct. 2012, pp. 1-163.
Faith Ellen, Panagiota Fatourou, Eric Ruppert and Franck Van Breugel, Non-blocking Binary Search Trees, date May 2010, pp. 1-37.
Philip W. Howard1 and Jonathan Walpole, Relativistic red-black trees, date Oct. 2013, pp. 1-31.

* cited by examiner

*Primary Examiner* — Shyue Jiunn Hwa
(74) *Attorney, Agent, or Firm* — IPHORIZONS PLLC; Narendra Reddy Thappeta

(57) ABSTRACT

An aspect of the present invention reduces blocking instances in parallel processing systems performing operations on trees. In one embodiment, a change operation is performed in a first execution entity and a traversal operation is performed in a second execution entity, with both the change operation and the traversal operation being designed to operate on a same node of a tree, and with the first execution entity and the second execution entity being executed concurrently in a digital processing system. A non-blocking access of the same node to both of the first execution entity and the second execution entity is permitted, thereby enabling the change operation and the traversal operation to be performed concurrently.

14 Claims, 23 Drawing Sheets

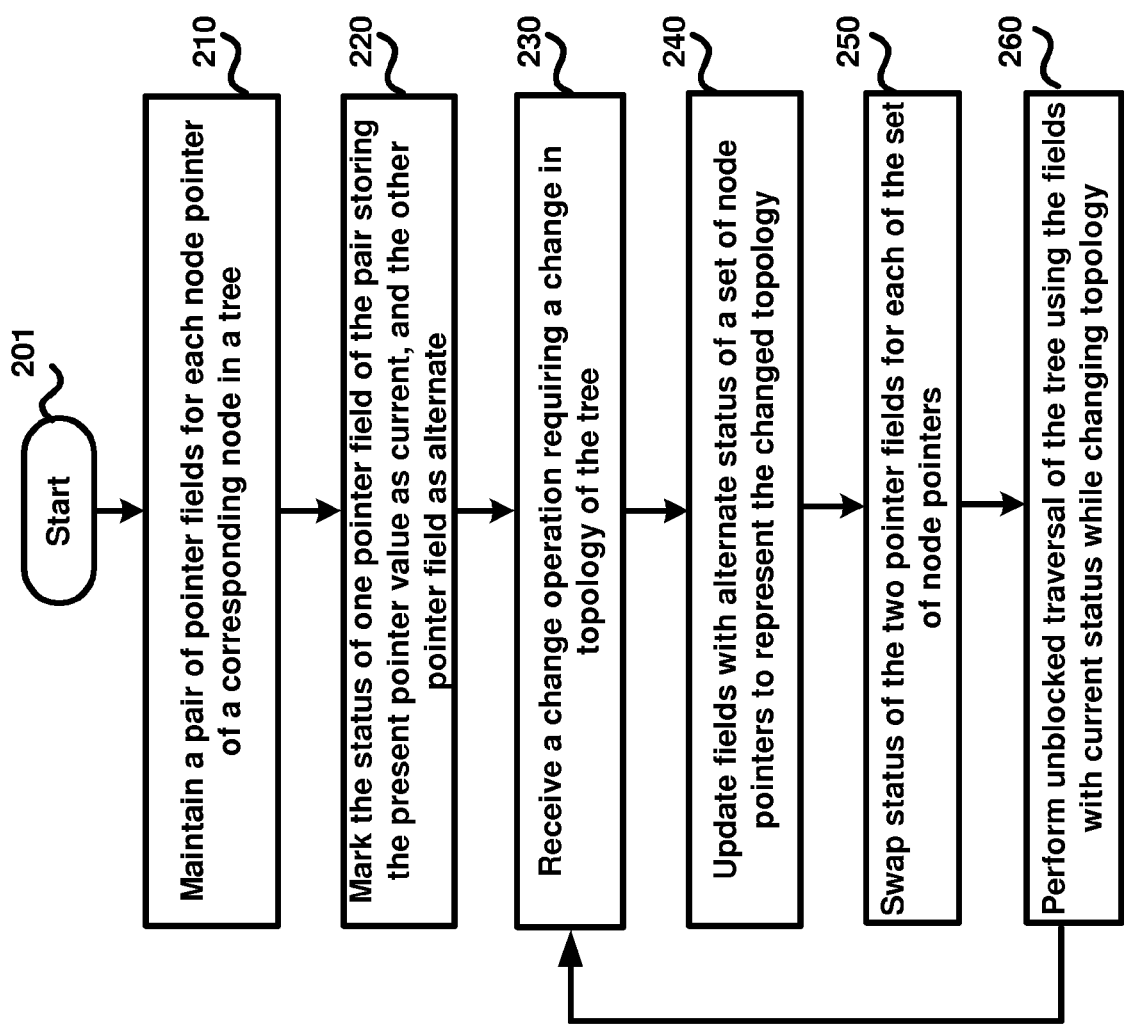

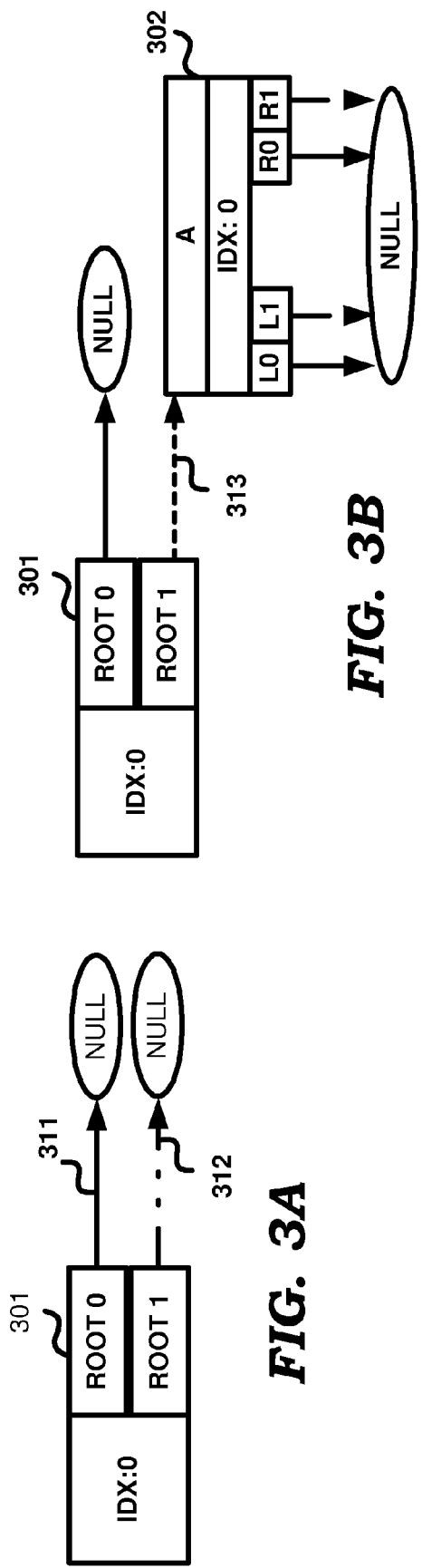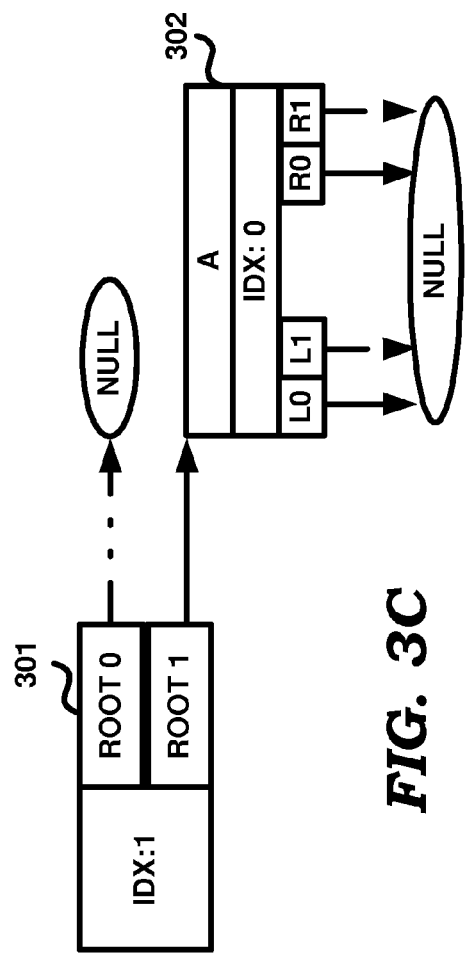

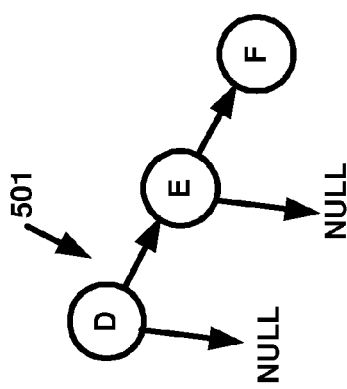
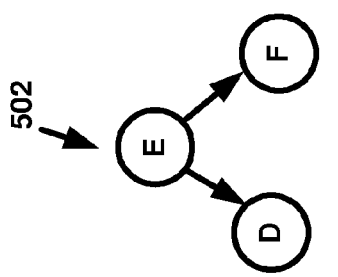
FIG.5A
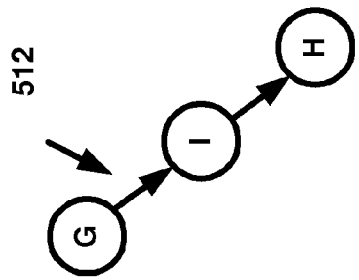
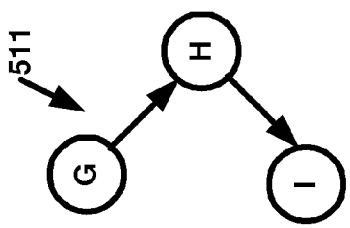
FIG.5B
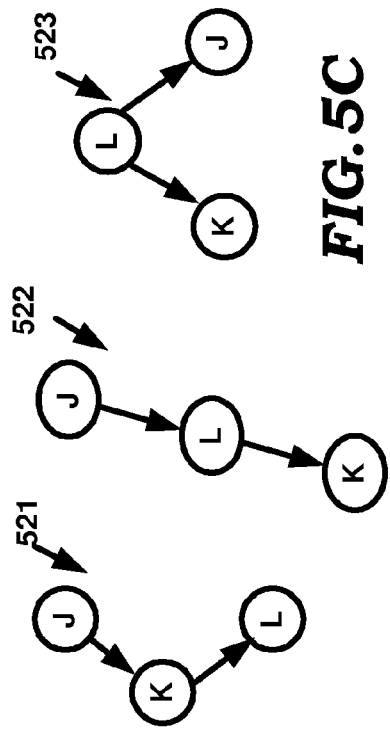
FIG.5C

```
START:
    Node = S
    while (Node != NULL):
        if(Node is marked):
            Lch = LeftChild(Node)
            Rch = RightChild(Node)
        else:
            Lch = AlternateLeftChild(Node)
            Rch = AlternateRightChild(Node)

If (Lch != NULL and Lch is marked):
            RemoveMark(Lch)
            Flip_index(Lch)

If (Rch != NULL and Rch is marked):
            RemoveMark(Rch)
            Flip_index(Rch)

Node = Parent(Node).
    End of while
END:
```

REDUCING BLOCKING INSTANCES IN PARALLEL PROCESSING SYSTEMS PERFORMING OPERATIONS ON TREES

RELATED APPLICATIONS

The present application is related to the following co-pending applications, which are both incorporated in their entirety into the present application:

1. Entitled, "Read and Write Operations on Shared Data Resources in Parallel Processing Systems", Ser. No. 14/246,158, Filed on even date herewith, naming as inventor GIRIDHAR NARASIMHAMURTHY.

2. Entitled, "Neighbor Lookup Operations in a Network Node", Ser. No. 14/246,160, Filed on even date herewith, naming the same inventors as in the subject patent application.

BACKGROUND OF THE DISCLOSURE

Technical Field

The present disclosure relates to parallel processing systems, and more specifically to reducing blocking instances in parallel processing systems performing operations on trees.

Related Art

A parallel processing system generally refers to a system in which multiple execution entities operate in parallel or concurrently in processing various data resources (or values for corresponding entities). For example, a system may contain multiple processors operating independently to provide many threads, with several threads executing concurrently on corresponding data resources.

A tree refers to hierarchical organization of data resources. A tree is characterized by a root and various other nodes in parent-child relationships (represented by a node pointer from the parent to child), with each node commonly storing a corresponding one of the data resources of interest. Each non-root node is either a direct child of the root or has a unique path to the root through other intermediate nodes. The nodes at a same distance (i.e., number of intermediate nodes) from the root are said to be at same level. The maximum level present in a tree is referred to as the height/depth of the tree.

There are several types of operations performed on trees. The tree operations can be viewed broadly as falling into two categories—traversal operations and change operations. Traversal operations are primarily read operations intended for examining the data resources stored in nodes. To access a desired data resource or to identify data resources with desired attributes, multiple nodes may be accessed, which is termed as traversal. In general, a traversal operation entails examining content of a node and determining any next nodes to access (based on the examined content), and access such determined next nodes.

Change operations on the other hand may either update the data resource stored in the node or change the structure/topology of the tree by adding/deleting nodes or even shifting the nodes. Shifting implies moving the position of a node to a different position in the tree. Shifting may be performed, for example, to obtain the desired balancing characteristic (e.g., rotation for minimal height in case of AVL (Adelson, Velskii and Landis) trees), as is well known in the relevant arts.

There are often instances of blocking, typically when a change operation is sought to be performed concurrent (in parallel) with another change or traversal operation. Blocking implies that the execution entity assigned to perform the tree operation is required to wait, though the execution entity is otherwise ready to continue with the performance of the tree operation.

For example, if a change operation is already in progress, access to at least some of the nodes of the tree may be denied to otherwise 'ready' execution entities (causing blocking of the ready execution entities), irrespective of whether such execution entities are performing traversal or change operations. Similarly, blocking may occur when a change operation is ready to be performed, while a traversal operation is already in progress.

Aspects of the present disclosure reduce at least some of such blocking instances, as described below with examples.

BRIEF DESCRIPTION OF THE DRAWINGS

Example embodiments of the present disclosure will be described with reference to the accompanying drawings briefly described below.

FIG. 2 is a flow chart illustrating the manner in which unblocked traversal (read operations) may be performed concurrent with changes effected to the topology of trees, according to an aspect of the present disclosure.

FIGS. 3A-3F depict the status of a tree at respective time instances illustrating the manner in which a node is sought to be inserted according to an aspect of the present disclosure.

FIG. 5A illustrates logically the (left) rotation desired for balancing an AVL tree in an embodiment.

FIGS. 5B and 5C respectively illustrate a corresponding double rotation for balancing an AVL tree in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
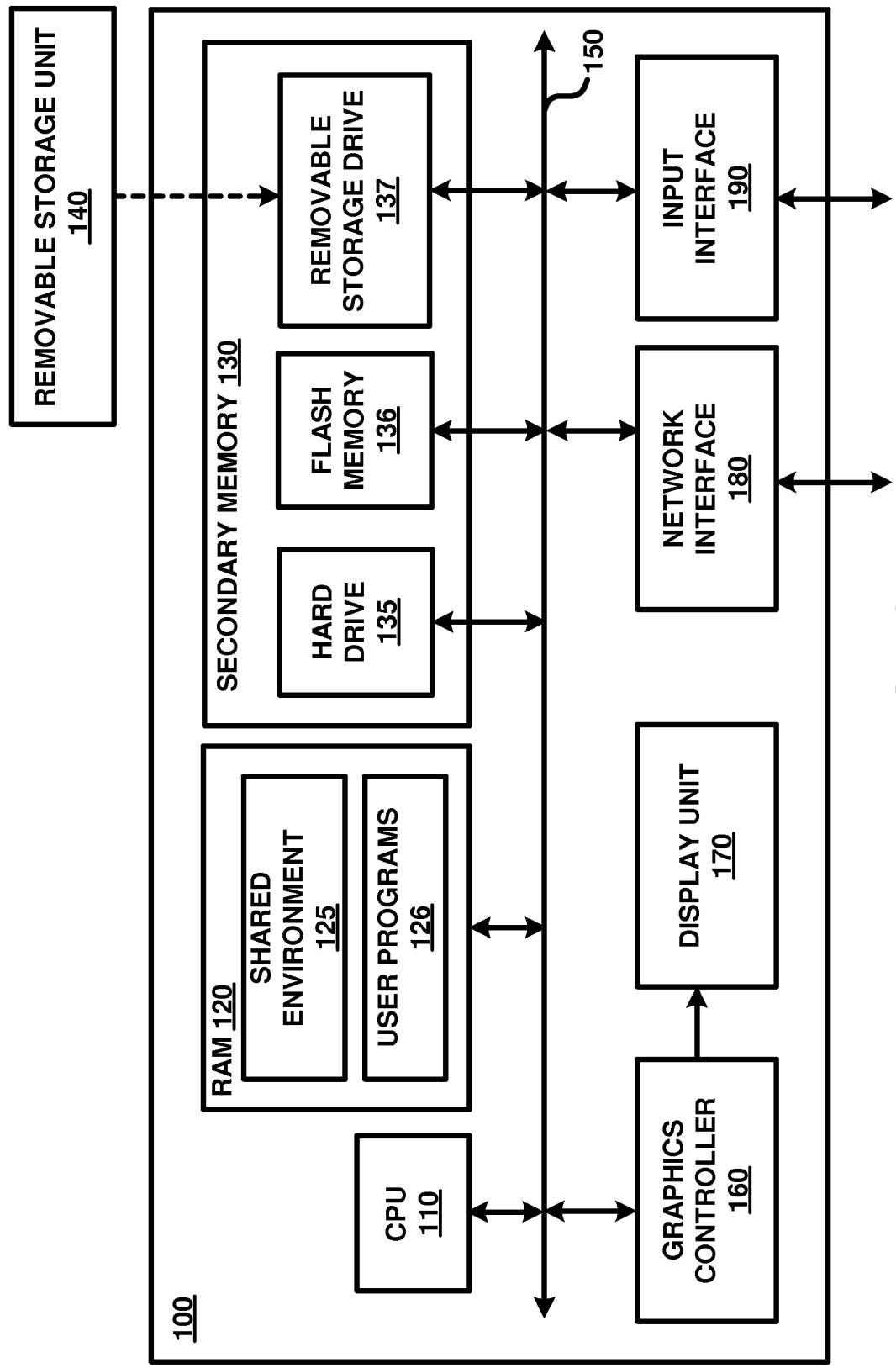
FIG. 1 is a block diagram illustrating the details of a digital processing system in which various aspects of the present disclosure are operative by execution of appropriate executable modules.

An aspect of the present invention reduces blocking instances in parallel processing systems performing operations on trees. In one embodiment, a change operation is (sought to be) performed in a first execution entity and a traversal operation is (sought to be) performed in a second execution entity, with both the change operation and the traversal operation being designed to operate on a same node of a tree, and with the first execution entity and the second execution entity being executed concurrently in a digital processing system. A non-blocking access of the same node to both of the first execution entity and the second execution entity is permitted, thereby enabling the change operation and the traversal operation to be performed concurrently.

According to another aspect of the present invention, a pair of pointer fields for each node pointer of a corresponding node in the tree is maintained, with the status of one pointer field of each pair/node pointer storing the present pointer value marked as current, and the other pointer field of the pair marked as alternate. The performing of the change operation of the same node is accordingly permitted using the pointer field marked as alternate, while the performing of the traversal operation of the same node is permitted using the pointer field marked as current.

By enabling the same node to be accessed using two different pointers, blocking instances during the performance of change operations concurrently with traversal operations is avoided (and thus reduced).

According to one more aspect of the present invention, when a change operation on a tree requires a change in topology of the tree, fields (marked) with alternate status of a set of node pointers are first updated to represent the changed topology, and then the status of the two fields (of the pair) for each of the set of node pointers are swapped. The unblocked traversal of the tree is performed using the fields with current status even while changing the topology.

In an embodiment, the tree is an AVL (Adelson, Velskii and Landis) tree, with the change of the topology required for balancing of the AVL tree as a part of the change operation. The change operations such as an insert operation of a new node into the tree or a delete operation of an existing node of the tree are performed while providing unblocked traversal of the tree. Any required balancing activities are also performed.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating the details of digital processing system 100 in which various aspects of the present disclosure are operative by execution of appropriate executable modules. Digital processing system 100 may contain one or more processors such as a central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present disclosure. CPU 110 may contain multiple processors, with each processor potentially being designed for a specific task. Merely for illustration, it is assumed that CPU 110 contains multiple processors which can execute in parallel to create various concurrently executing threads (examples of execution entities), at least some of which may access shared data resources. Alternatively, CPU 110 may contain only a single processor, which also provides concurrent threads. In such a scenario, concurrent execution entities may be implemented, for example, using time-slicing techniques well known in the relevant arts.

RAM 120 may receive instructions from secondary memory 130 using communication path 150. RAM 120 is shown currently containing software instructions constituting operating environment 125 and/or other user programs 126. In addition to operating environment 125, RAM 120 may contain other software programs such as device drivers, virtual machines, etc., which provide a (common) run time environment for execution of other/user programs. The shared data resources (e.g., trees described below) may be stored in RAM 120. Though shown as a single unit usable by CPU 110, RAM 120 may be viewed as containing multiple units, with some of the units being contained in specific components (e.g., network interface 180) to store the shared resources accessed in accordance with the features of the present disclosure.

Graphics controller 160 generates display signals (e.g., in RGB format) to display unit 170 based on data/instructions received from CPU 110. Display unit 170 contains a display screen to display the images defined by the display signals. Input interface 190 may correspond to a keyboard and a pointing device (e.g., touch-pad, mouse) and may be used to provide inputs.

Secondary memory 130 may contain hard drive 135, flash memory 136, and removable storage drive 137. Secondary memory 130 may store the data and software instructions (for implementing the steps of FIG. 2 and other features described below), which enable digital processing system 100 to provide several features in accordance with the present disclosure. The code/instructions stored in secondary memory 130 may either be copied to RAM 120 prior to execution by CPU 110 for higher execution speeds, or may be directly executed by CPU 110.

Some or all of the data and instructions may be provided on removable storage unit 140, and the data and instructions may be read and provided by removable storage drive 137 to CPU 110. Removable storage unit 140 may be implemented using medium and storage format compatible with removable storage drive 137 such that removable storage drive 137 can read the data and instructions. Thus, removable storage unit 140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 140 or hard disk installed in hard drive 135. These computer program products are means for providing software to digital processing system 100. CPU 110 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 130.

Volatile media includes dynamic memory, such as RAM 120. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 150. Transmission media can also take the form of acoustic or light waves, such as those generated during radio-wave and infra-red data communications.

Network interface 180 provides connectivity to a network and may be used to communicate with other systems connected to the network (not shown). The network may be implemented according to Internet Protocol (IP), and according to aspects of the present disclosure the shared data resources may correspond to entries which translate each IP address to corresponding Ethernet Address (MAC address, in general). As may be appreciated, the IP protocol is tolerant to transient inconsistencies of incorrect mappings (or stale data). Aspects of the present disclosure take advantage of such situation to provide non-blocking read requests, as described below with examples.

3. Unblocked Operations on Trees

FIG. 2 is a flow chart illustrating the manner in which unblocked operations are performed on trees according to an aspect of the present disclosure. The flowchart is described with respect to the digital processing system of FIG. 1, in particular, CPU 110, merely for illustration. However, the features can be implemented in other systems, components (e.g., in network interface 180) and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, CPU 110 maintains a pair of pointer fields for each node pointer of a corresponding node in a tree. As may be readily appreciated, a tree at any time instance contains a root and one or more child nodes. A pair of pointer fields is maintained for each node pointer of such root and child nodes. If the node of a tree is defined to contain multiple children, at least for such a purpose, multiple node pointers may be required in the corresponding nodes. With respect to AVL type trees, for which the root node itself can change (during balancing operations), an additional pointer may be maintained to point to the present root node.

In step 220, CPU 110 marks the status of one pointer field of the pair (corresponding to anode pointer and) storing the present pointer value as current, and the other pointer field of the pair as alternate. From the description below, it may be appreciated that one of the two pointer fields (of the pair) for a node pointer is operative as a current pointer and the other is operative as an alternate pointer. Any appropriate convention can be employed for such marking, though the description below is provided based on a single bit, which indicates which of the two fields, is current. In a steady state, the pointers represented by the current fields represents the topology of the tree at that time instance.

In step 230, CPU 110 receives a change operation requiring a change of topology to the tree. As noted above, such change may include insertion/deletion of a node(s) or shifting of node(s) to new position(s). As described below, the shifting may be inherently required for various rotation operations required for balancing of the tree upon node insertion/deletion.

In step 240, CPU 110 updates the pointer fields with alternate status in each pair of a specific set of node pointers to represent the desired changed topology. In other words, the updated pointer fields with alternate status in the specific set of node pointers, in combination with the pointer fields with current status in the other node pointers of the tree, together represents the desired changed topology.

In step 250, CPU 110 swaps the status of the two pointer fields in each node of the specific set of node pointers. As a result of (in particular, upon completion of) the swap, the current fields of the nodes together represent the desired changed topology.

In step 260, CPU 110 performs unblocked traversal of the tree using the pointer fields with current status, even in the duration of steps 240 and 250. It may be appreciated that the view (of the tree) prior to the update/swap and the view after the update/swap are different, and the results of performance of traversal operations in between duration may depend on the manner in which steps 240 and 250 are sequenced/ interspersed when considering processing of individual nodes. Control then passes to step 230 to process the next operation.

It may be appreciated that the changed topology is not visible to traversal operations until the swap of step 250 is completed. That is, although the change is made, it is not brought into effect until the swap operation is performed. However, due to the resulting unblocked accesses permitted, the throughput performance can be enhanced at least in comparison with alternative systems where an ongoing change operation causes blocking of later/further change or traversal operations.

The features of above can be applied in various contexts and an example context is described below in further detail.

4. Insert Operations in a AVL Tree

FIGS. 3A-3F together illustrate the manner in which nodes may be inserted into an AVL tree, in an embodiment of the present disclosure. As is well known in the relevant arts, AVL (Adelson-Velskii and Landis) tree is a binary self-balancing tree, where each node has two child nodes and the height of the tree is sought to be maintained minimal for the total number of nodes in the tree at any given time. According to one convention, in relation to each node, the descendants having higher values (compared to the value of the node) are stored to the right, while descendants having lesser values are stored to the left (while maintaining a maximum of two children and ensuring minimal height).

To insert a new node storing a specific value, the tree is traversed to determine the 'position' at which the node is to be inserted in accordance with the convention noted above. The specific value is compared to the node value in the root node (presently traversed node) and traversal continues via the node to the left of the root node as the presently traversed node, if the specific value is less than the node value. Otherwise traversal continues to the right. The new node is eventually placed as a leaf of the tree. The leaf may be placed either as a sibling to a pre-existing leaf (left or right), or a new level may be created in the tree hierarchy for the new node.

Each of the FIGS. 3A-3F represents the status of the AVL tree at a corresponding time instance of a sequence of time instances t1-t6. It may be appreciated that some of the views are shown for understanding the underlying principles of operation, though in real-world implementations some of the views can be conveniently merged (and/or performed using alternative equivalent techniques).

The tree is shown containing root pointer 301 pointing to the root of the tree, and any nodes of the tree, as applicable at the corresponding time instances. Each node is deemed to store a corresponding value (data resource), and child nodes to the left are deemed to store lesser values and child nodes to the right are deemed to store greater values.

The child nodes are shown with two pointer fields (L0 and L1) for each left node pointer and two pointer fields (R0 and R1) for each right node pointer. The index (IDX) field in each node indicates whether the pair (L0 and R0, for IDX=0) is operative or the pair (L1 and R1, for IDX=1) is operative at the corresponding time instance for the purpose of traversal. In other words, IDX=0 in a node indicates that L0 and R0 are the current fields and L1 and R1 are alternate fields. On the other hand, IDX=1 indicates that L1 and R1 are the current fields and L0 and R0 are the alternate fields. While the description is provided assuming a single index field for both left and right node pointers, alternative embodiments may employ individual index fields (a left index field for the left node pointer and a right index field for the right node pointer) for each node pointer.

A solid line (e.g., 311) in all tree diagrams represents a pointer from a current field, while a broken line (e.g., 312) represents a pointer from an alternate field. A dotted line (e.g., 313) represents a pointer from an alternate field, but with an updated status corresponding to step 240, and awaiting the swap of step 250. Once the swap is completed, the same link is shown with a solid line.

FIG. 3A depicts that the tree contains only root pointer 301 at time instance t1. The current pointer (ROOT 0) is shown pointing to NULL by solid line 311. Alternate pointer (ROOT 1) is also shown pointing to NULL (by broken line 312), though not relevant to traversal. As is well known in the art, the value "NULL" represents a pre-defined value (for example, the value "0") that indicates that the pointer (such as ROOT 0 and ROOT 1) does not point to/refer to a valid node.

FIG. 3B depicts the status of the tree at time instance t2, and in particular, operation of step 240, as node 302 is sought to be inserted to the left of root pointer 301 (arbitrarily chosen). The alternate pointer (ROOT 1) is showing pointing to node 302 by dotted line 313 (since IDX=0). Node 302 in turn is shown pointing to NULL (as being the leaf node).

FIG. 3C depicts the status of the tree at time instance t3, and in particular, as insertion of node 302 is completed (completion of step 250). It may thus be appreciated that the view of FIG. 3A is presented for traversal prior to t3, while the view of FIG. 3C (node 302 being a child of root) is presented from t3 onwards. It should be appreciated that between the time instances t2 to t3, the value '0' for IDX in root pointer 301 causes the tree of FIG. 3B to be equivalent to the tree of FIG. 3A for traversal operations.

Figure 3D:
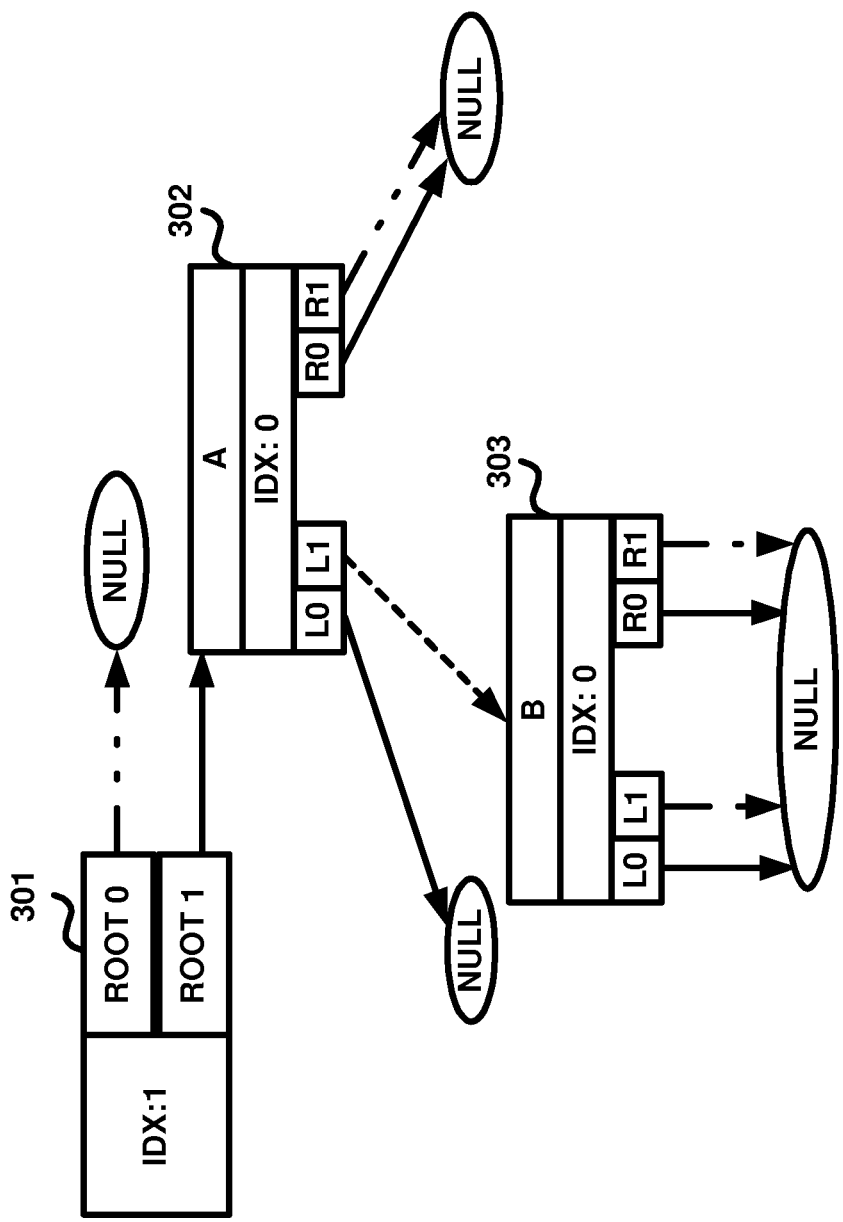

FIG. 3D depicts the status of the tree at time instance t4, assuming value B is less than A. Even though L0 (operative in view of IDX=0) of node 302 points to null, the alternate pointer L1 (corresponding to IDX=0 in node 302) is shown being used for attempted addition of node 303. At time instance t5, IDX field of node 302 is shown set to 1 in FIG. 3E to indicate that L1 is to be thereafter operative for traversal of the tree.

Figure 3E:
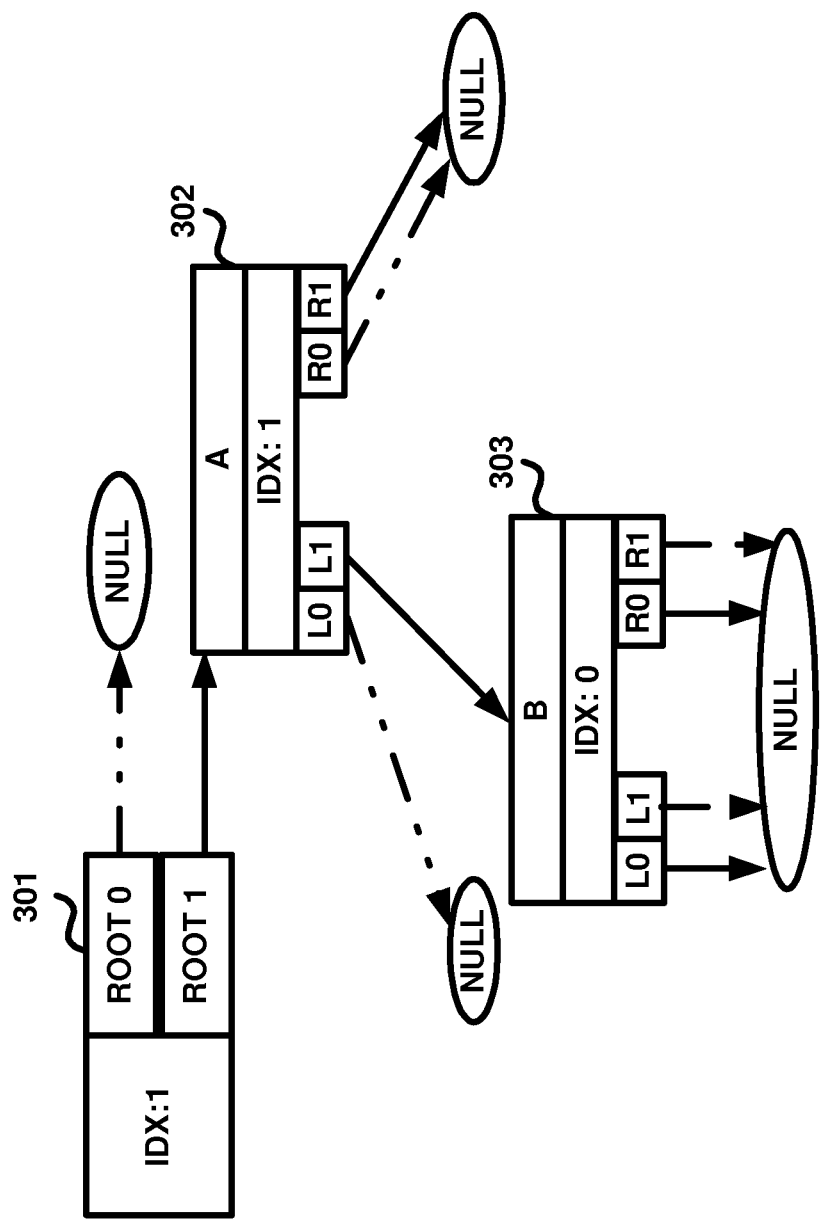
Figure 3G:
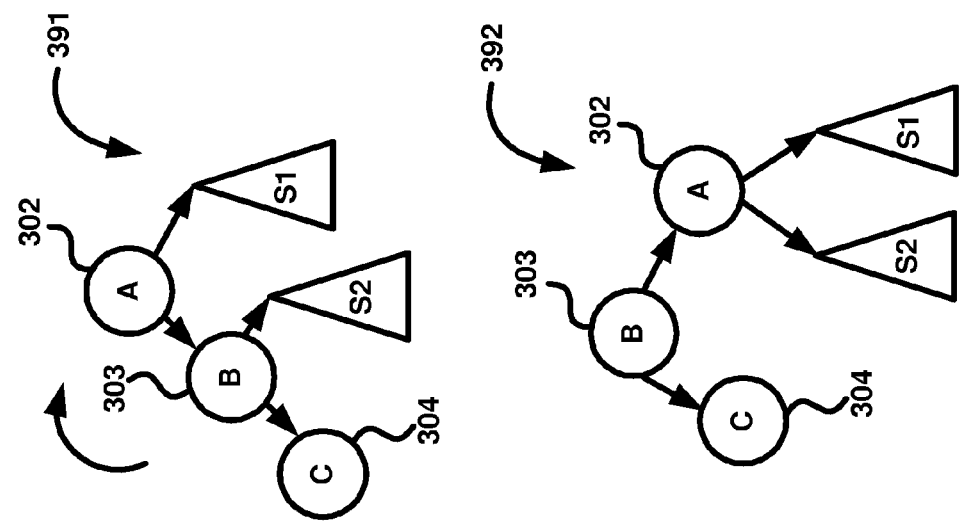
FIG. 3G depicts logically the (right) rotation desired for balancing an AVL tree, as a part of insertion of a new node.
Figure 3F:
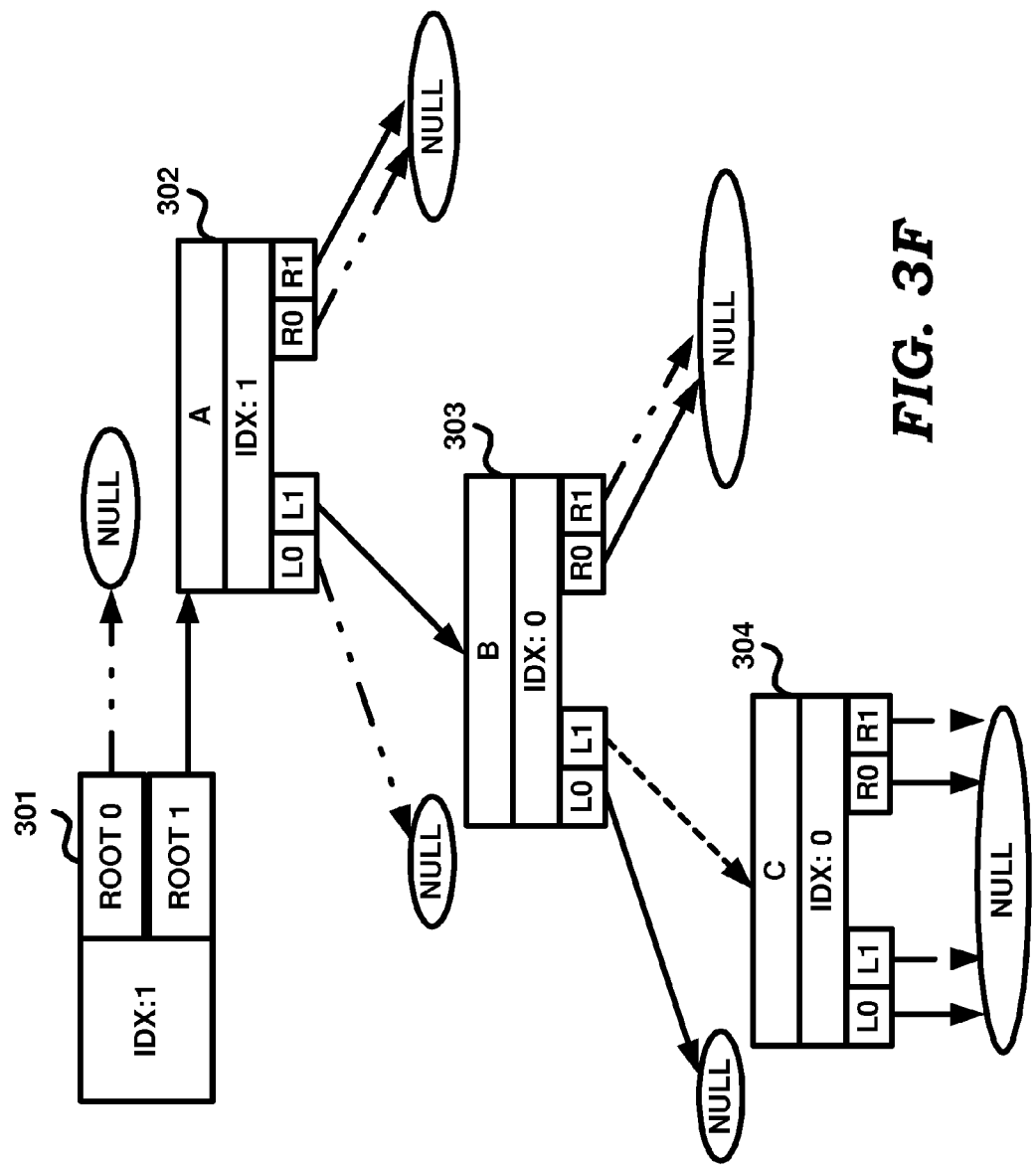

FIG. 3F depicts the status of the tree at time instance t6, with node 304 being shown inserted to the left of node 303 using alternate pointer L1 assuming value C is less than B. C is not accessible by tree traversal until the IDX of node 330 is set to 1. Current pointer L0 could have been chosen for inserting node 304, should a node imbalance not have arisen. Balancing aspect is described below.

It may be noted that each node of an AVL tree is associated with a balance factor, which represents a difference of the depth of the sub-tree to the right and that to the left. In view of the self-balancing approach of AVL, each node would have a balance factor of −1, 0 or +1. When balance factor of +2 or −2 is obtained at a given node, the sub-tree from that level needs to be balanced by the appropriate rotation(s).

With respect to FIG. 3F, it may be observed that the depth of nodes to the left of root pointer 301 is 2, while the depth of the nodes to the right of root pointer 301 is 0, which implies that the AVL tree is unbalanced and a rotation is required to rebalance the tree.

5. Rotation(s) Due to Insertion

FIG. 3G logically illustrates the desired rotation for the topology of FIG. 3E In particular, tree portion 391 depicts the topology corresponding to FIG. 3F (with sub-trees S1 and S2 added for a more comprehensive understanding) and tree portion 392 depicts the rotated (to right, as shown by the arrow there) topology for obtaining the balancing required of AVL trees. As may be readily observed, node 302 is the root in tree portion 391, while node 303 is the root in tree portion 392. Tree portion 392 (or all nodes thereof) is balanced, as the height on both sides of the tree is 1.

The manner in which such rotation is obtained in one embodiment, is described below with respect FIGS. 4A-4G, which respectively represent the status of the tree at the corresponding time instance of a sequence of (or successive) time instances t7-t13. As may be readily observed, the alternate pointers are first updated and then the IDX fields of the desired nodes are flipped (changed from 0 to 1 or vice versa), starting from the parent node of the inserted node.

Figure 4A:
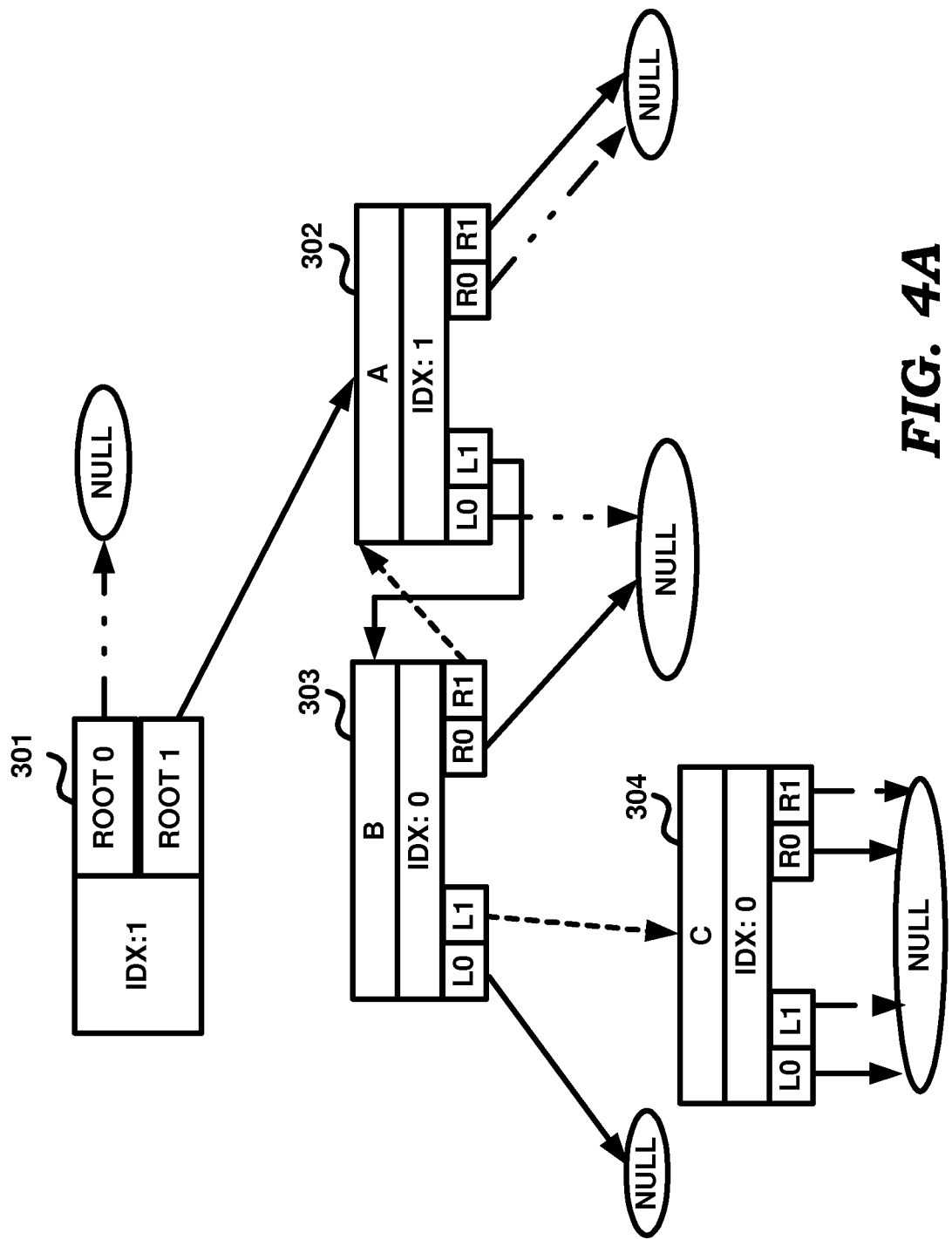
FIGS. 4A-4F depict the status of an AVL tree as nodes are sought to be shifted for a desired rotation, according to an aspect of the present disclosure.

FIG. 4A depicts the tree with the alternate pointers of nodes 302 and 303 set to correspond to tree portion 392 (in comparison with the tree of FIG. 3F) at time instance t7. In particular, alternate pointer R1 of node 303 is shown pointing to node 302 and alternate pointer L0 of node 302 is shown pointing to NULL. The current and alternate pointers of root pointer 301 are shown unchanged, though the alternate field of root pointer 301 can also be changed prior to start of flipping, described below.

Figure 4B:
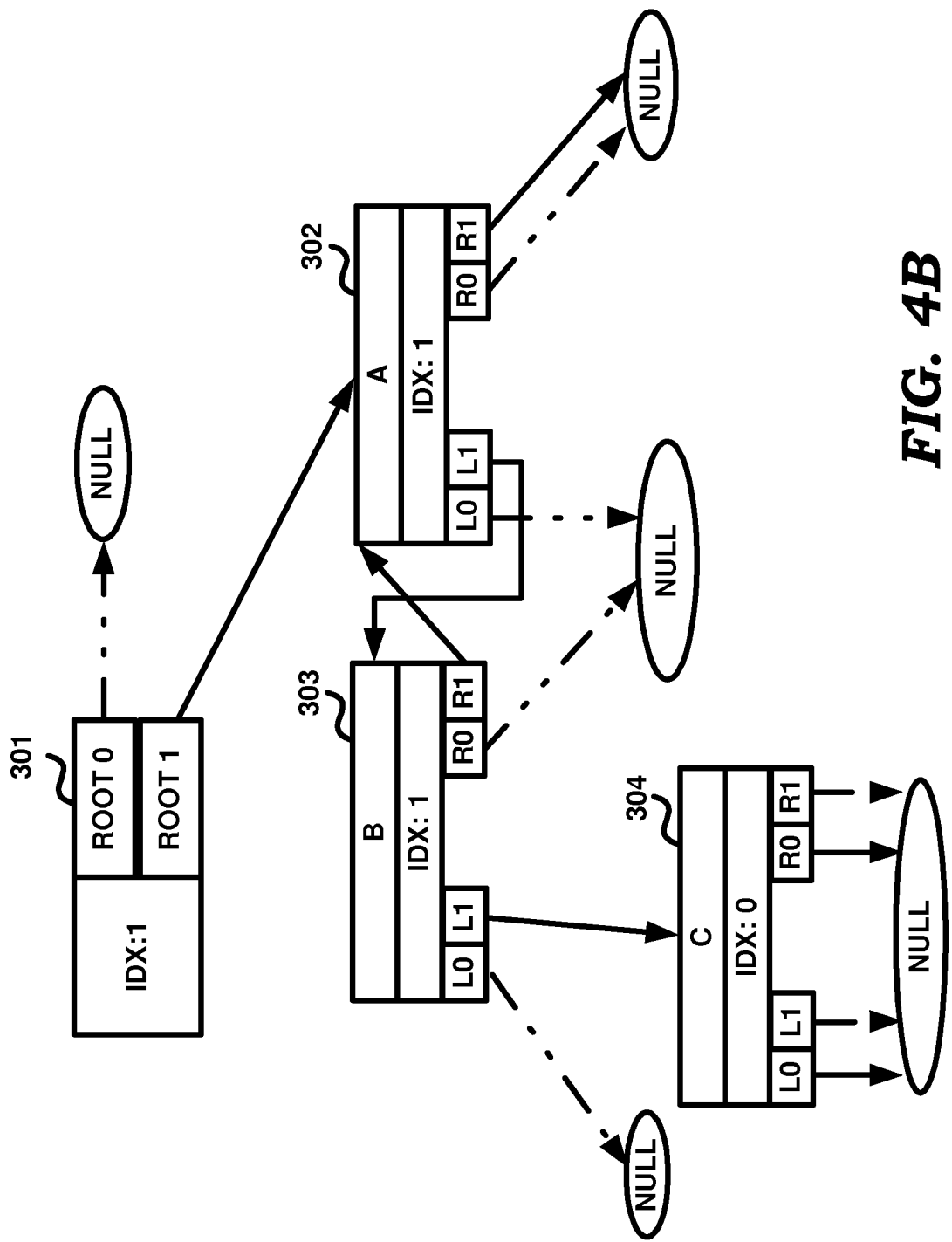

FIG. 4B depicts the tree with the IDX field of node 303 flipped (from 0 to 1) at time instance t8. As may be appreciated, node 303 is the parent of inserted node 304 and (the corresponding index field) is thus shown flipped first.

Figure 4C:
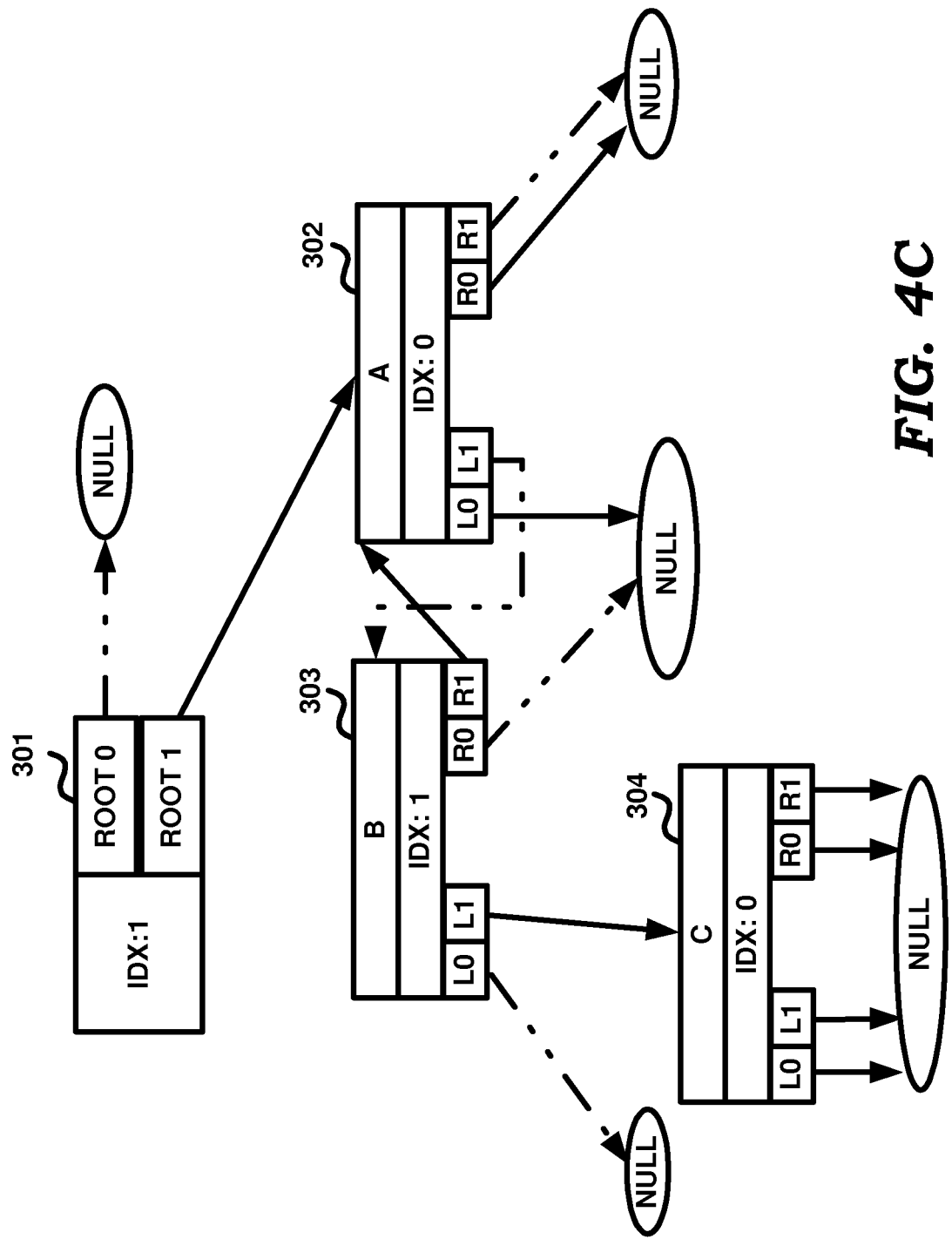

FIG. 4C depicts the tree with the IDX field of node 302 flipped at time instance t9. Node 302 represents the parent of the node 303 flipped in the prior time instance t8. It may be appreciated that a traversal operation such as for visiting each node in the tree during the insertion will visit different sets of nodes at different time instances (based on the value of the IDX field in the nodes of the tree). For example, the traversal/visit operation performed between time instances t7 and t8 will visit nodes 302 and 303, while after time instance t8 will visit nodes 302, 303 and 304.

Figure 4D:
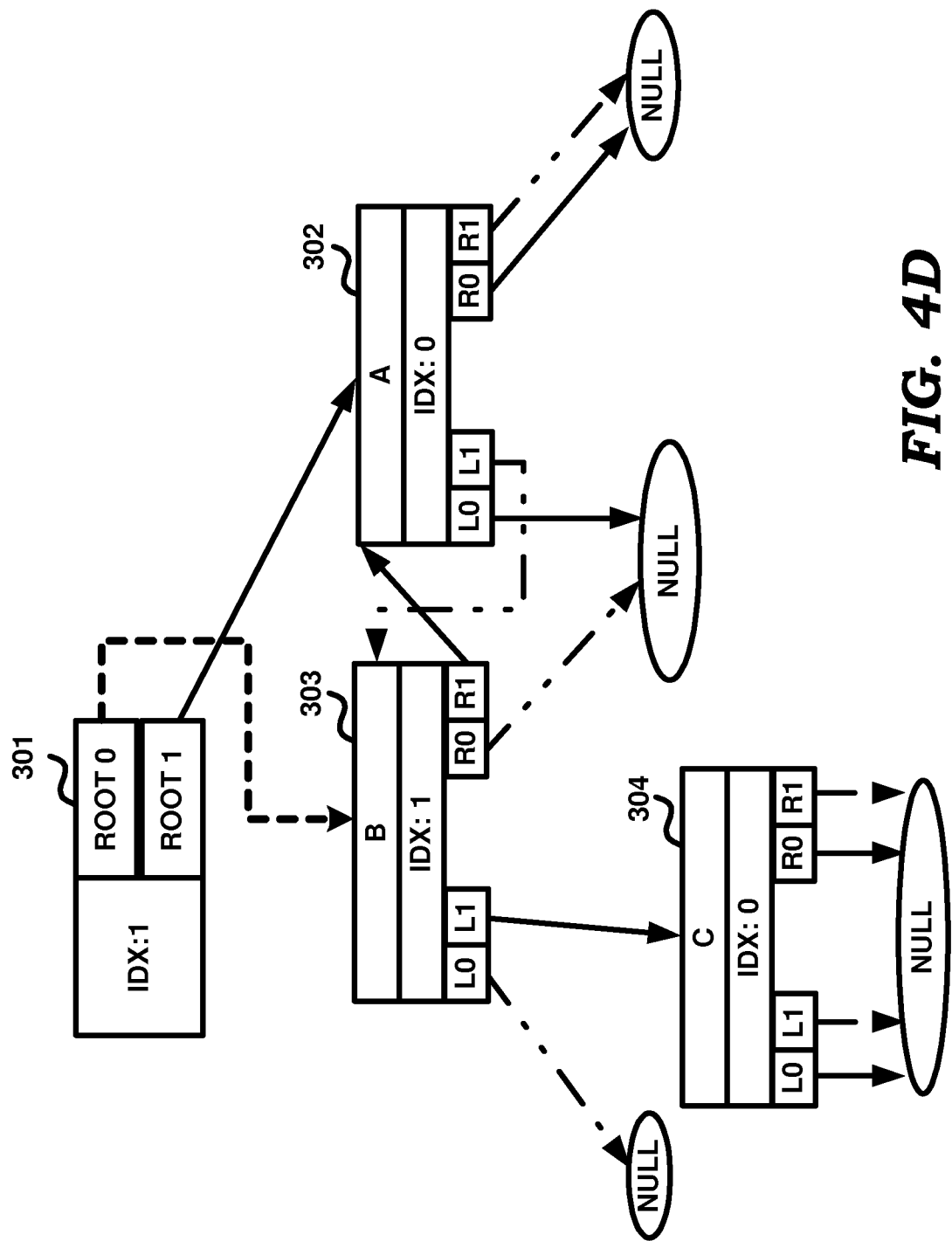
Figure 4E:
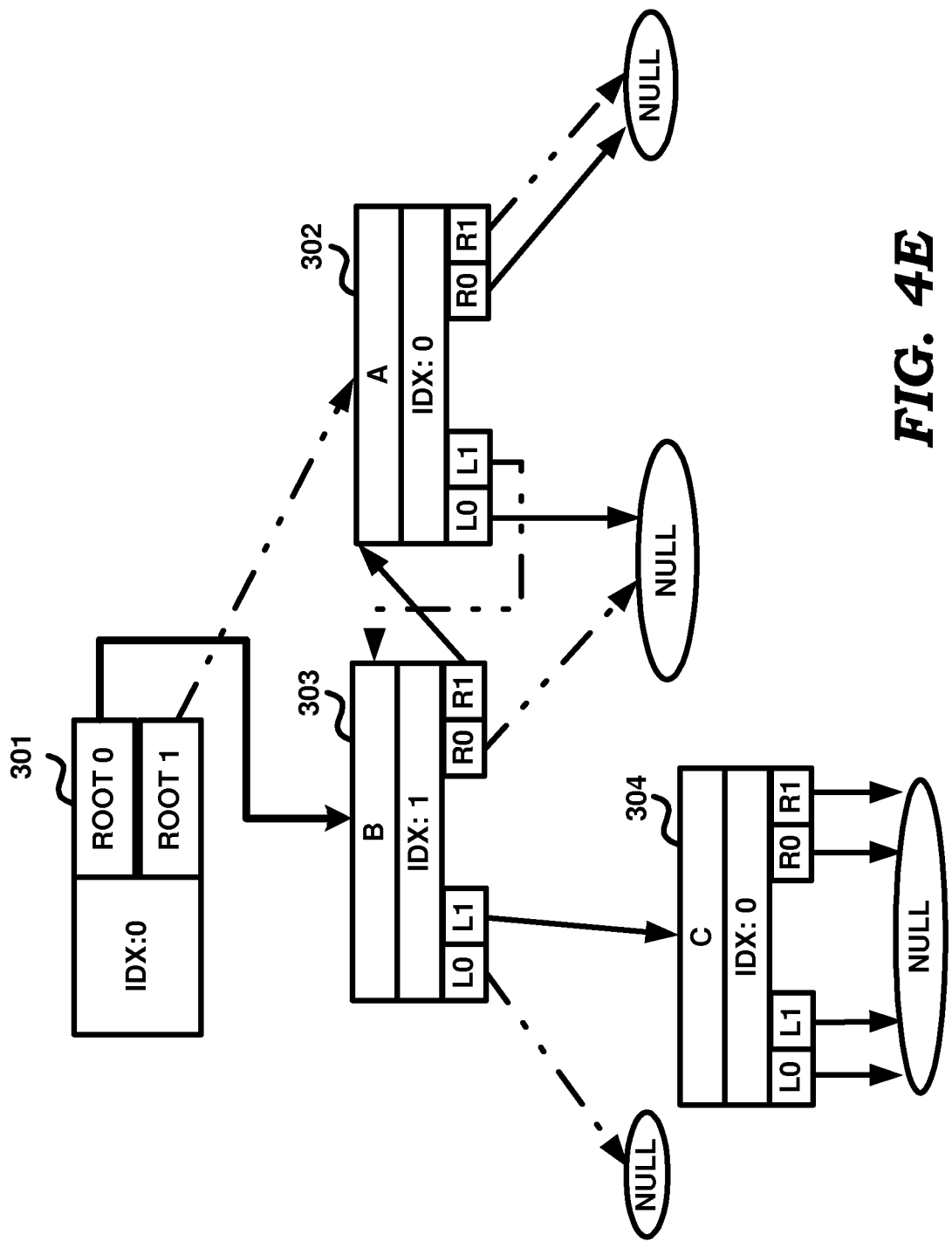
Figure 4F:
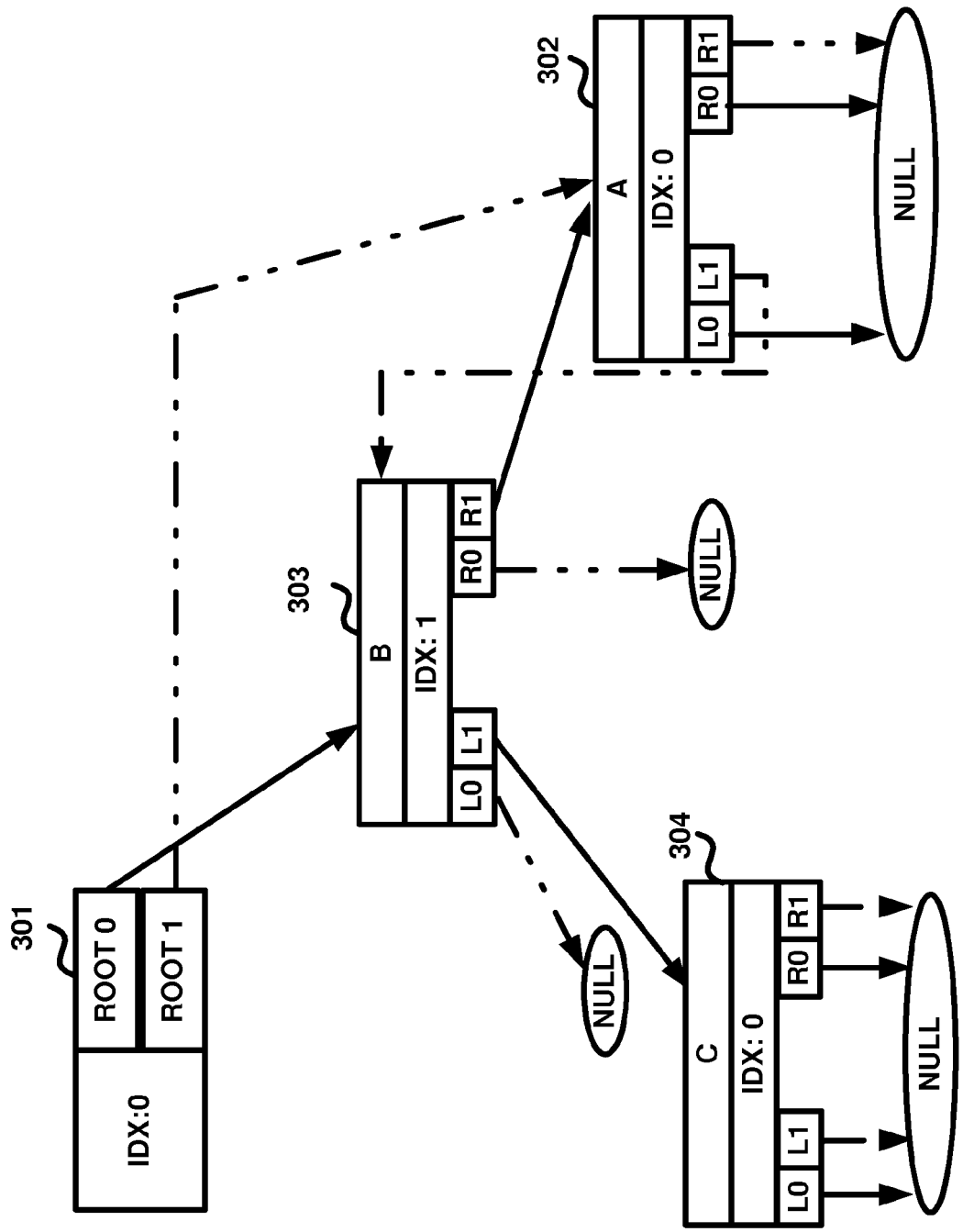

FIG. 4D depicts the tree with the alternate pointer (ROOT 0) set to point to node 303 at time instance t10. FIG. 4E depicts the tree with the IDX field flipped to 0 at time instance t11. Accordingly, the rotation is deemed complete by t11, consistent with the view of tree portion 392. FIG. 4F provides a clearer view of the changed topology in view of the insertion of different nodes in the tree.

By having started with the parent of the inserted node, inserted node 304 is visible (available in tree traversal using the current pointers) via B starting from time instance t8 (as noted above). However, for a duration between t9 and t11, node B may not be visible for new traversal operations in that duration.

It may accordingly be appreciated that the tree traversal is non-blocking in the entire duration t1-t11. However, some of the nodes are not visible for a short duration, which may be acceptable in at least some environments, where errors or unavailability of data for a short duration is acceptable.

6. Insertion Operations in General

While some of the principles of present disclosure are illustrated above with respect to FIGS. 4A-4E, the description is continued in relation to common scenarios encountered with insertion of nodes in AVL trees. For further details on AVL trees, the reader is referred to a book/document entitled, "Data Structures Using C and C++ (2nd Edition)" by Yedidyah Langsam et al, ISBN-10: 0130369977 (hereafter "AVL Reference"). The scenario of FIG. 3G is referred to as a first scenario, in which A>B>C (wherein '>' represents the 'greater than' relation, and C represents the newly inserted node). As may be appreciated, in such a scenario, the pointer (root pointer) from the parent of A (to point to B), left pointer of A (to point to NULL), and right pointer of B (to point to C) in tree portion 391 are required to be modified, as shown by the corresponding dotted arrows above during rotation. Tree portion 391 is said to be rotated (right) on A to arrive at tree portion 392.

FIG. 5A depicts a second scenario, in which D<E<F in tree portion 501 (wherein '<' represents the 'less than' relation and F represents the newly inserted node). The pointer from the parent of D (to point to E), right pointer of D (to point to NULL), and left pointer of E (to point to D) in tree portion 501 are required to be modified (a left rotation) to arrive at tree portion 502.

FIG. 5B depicts a third scenario in which H>G and I<H, with I representing the node sought to be inserted in tree portion 511. In such a situation, a double rotation is said to be required, with the result of first rotation (right rotation of H) shown in tree portion 512 and the result of subsequent second rotation (left rotation of G) shown in tree portion 513. For changing from tree portion 511 to tree portion 513 in the context of a broader tree, the pointer from parent of G (to point to node I), the left and right pointers of I, the right pointer of G and the left pointer of H need to be modified to arrive at tree portion 513.

FIG. 5C depicts a fourth scenario in which K<J and L>K, with L representing the node sought to be inserted in tree portion 521. In such a situation also, a double rotation is said to be required, with the result of first rotation (left rotation of K) shown in tree portion 522 and the result of subsequent second rotation (right rotation of J) shown in tree portion 523. The changes required from portion 521 to arrive at portion 523 are explained similar to as in FIG. 5B.

Thus, a node similar to 302 (or 303/304) may be maintained (along with root node) for each child node in the respective tree of FIGS. 5A-5C. Again, as described above with respect to FIGS. 3A-3F, the alternate pointers may be set consistent with the changes required for the corresponding scenarios noted above and the IDX field of the nodes may be flipped in accordance with the approach already noted above. The description is continued with a more general approach to flipping the nodes as a part of insert operations.

7. Flipping Nodes for Insert Operations

In the following description, it is assumed that an insert operation caused a new node N (e.g. 303 in FIG. 3D) to be added to either the left or the right subtree of a parent node P (e.g., 302 in FIG. 3D). Since N is attached to the alternate pointer of P, the IDX field of node P always needs to be flipped irrespective of whether any other nodes are flipped or not. It is then determined whether the addition of the node N caused an imbalance in the tree.

If an imbalance is not determined to have occurred (that is, the tree is balanced after insertion, and no rotations are required), the flipping operation is concluded after flipping the IDX field of the parent node (e.g. 302 in FIG. 3D). The flipping is demonstrated above in FIGS. 3C and 3E above. Though not shown in the above examples, the no-rotation cases occur even in several cases of AVL trees with more depth.

However, if an imbalance is determined to have occurred, a corresponding rotation (either single/double, left/right, etc. as described above), is required to be performed to make the tree balanced again. It may be appreciated that if such an imbalance is caused, the imbalance has to be at nodes that are predecessors of P, and can occur anywhere between the parent of P and the root of the tree (e.g. 302), including both. In other words, parent node P can never be unbalanced due to the insertion of node N, since the addition of N as a child of P can either increase the absolute value of node P's balance factor from 0 to 1 (P was a leaf node before the insertion) or decrease the absolute value of node P's balance factor from 1 to 0 (P had a child before the insertion).

Furthermore, it is well known in the relevant arts that after an insert operation, if the tree is not balanced, then a single balance operation at the youngest unbalanced node will balance the whole tree. The single balance operation may involve single or double rotations. A single rotation involves changes to alternate pointers of only two nodes: (1) the point of rotation (node X) where the balance was lost; and (2) the child node Y of node X depending on the direction of imbalance. In such a scenario, the IDX fields of nodes X and Y may also be required to be flipped. As an illustration with respect to FIG. 5A, we have three nodes D, E, and F, and balance of the tree is lost at D. A left rotation is required at D. Thus, D is node X. Since a left rotation is required at D, the right child of D, i.e. E is node Y. Thus Y is the child of the point of rotation X, in the direction opposite to that of the rotation.

Alternatively, a double rotation involves changes to the alternate pointers of three nodes: (1) the point of rotation (node X) where the balance was lost; (2) the child node Y of node X depending on the direction of imbalance; and (3) the child node Z of node Y depending on the direction of imbalance. This is due a double rotation being a (first) single rotation at node Y followed by a (second) single rotation at node X in the opposite direction of the first rotation. In such a scenario, the IDX fields of nodes X, Y and Z may also be required to be flipped.

The rotations may involve one or both of the nodes N and P. However, node N could be involved only during a double rotation (Z=N), while node P could be involved during a single rotation (Y=P), or a double rotation (Y=P, Z=P). In other words, node N can never be node X nor node Y, while node P can never be node X.

Furthermore, assuming that node R is the root of the tree after rotation(s) at X and balancing, it may be appreciated that node R can be either node Y if a single rotation is done at node X, or node Z if a double rotation is done at node X. If node X is not the root of the tree, let XP be the parent of X (before rotation). Since a single/double rotation has occurred at X, and R can be only Y or Z and not X, we attach R to the alternate pointer of node XP. Accordingly, the IDX filed of node XP needs to be flipped.

Thus, after any insert operation, the maximum number of nodes whose value of the index fields need to be flipped is 5, namely, node P, node X, node Y, node Z, node R, and node XP. The above conditions lead to the following algorithm to flip the indices of the required nodes after an insert operation (shown according to pseudo code):

```
START
    Flip_index(P)
    IF no rotation occured, END.
    IF a double rotation occured at X:
        IF (Y != P):
            Flip_index(Y)
    Flip_index(X)
    IF (R != P):
        Flip_index(R)
    IF (XP != NULL):
        Flip_index(XP)
END
```

The application of the above algorithm as relevant to the above noted different scenarios is described below briefly.

For example, for the right rotation illustrated in FIG. 3O, new node N=C, parent node P=B and the point of imbalance node X=A, with only a single rotation at node X (=A) performed to arrive at tree portion 392. According to the above algorithm, the IDX field of node P, node X and node XP (here the root pointer) are to be flipped. Similarly, for the second scenario of FIG. 5A, the IDX fields of the parent node N (=E), node X (=D) and node XP (the root pointer) are flipped (in that order).

In case of the third scenario shown in FIG. 5B, new node N=I, parent node P=H, the point of imbalance X=G, the child of X, i.e, Y=H, the child of Y, i.e Z=I, and the new root node of this subtree after rotation R=Z=I. The IDX fields of the parent node P(=Y=H), node X(=G), and node R(=Z=I), and node XP (here the root pointer) are flipped in that order. Similarly for the fourth scenario show n in FIG. 5C, the IDX fields of the parent node P(=Y=K), node X(=J), node R(=Z=L), and node XP (here the root pointer) are flipped in that order.

Thus, the flipping of the value of the index (IDX) fields of the various nodes of a balanced tree is performed as part of an insertion operation. However, in some of the durations, some of the nodes may not be visible during traversal, which may be acceptable at least in translating IP address to MAC address, etc. The description is continued with respect to details of a change operation for deletion of a node.

8. Deletion Operations in a AVL Tree

Each of FIGS. 6A to 6I represents the status of a tree at corresponding time instance of a sequence of time instance t21-t29 in an embodiment. The Figures together illustrate the manner in which some of the features of the present disclosure can be used in the context of deletion of a node from an AVL tree (though the features can be applied in the context of other trees (for example, red-black trees) as well, as will be apparent to a skilled practitioner by reading the disclosure provided herein).

Figure 6A:
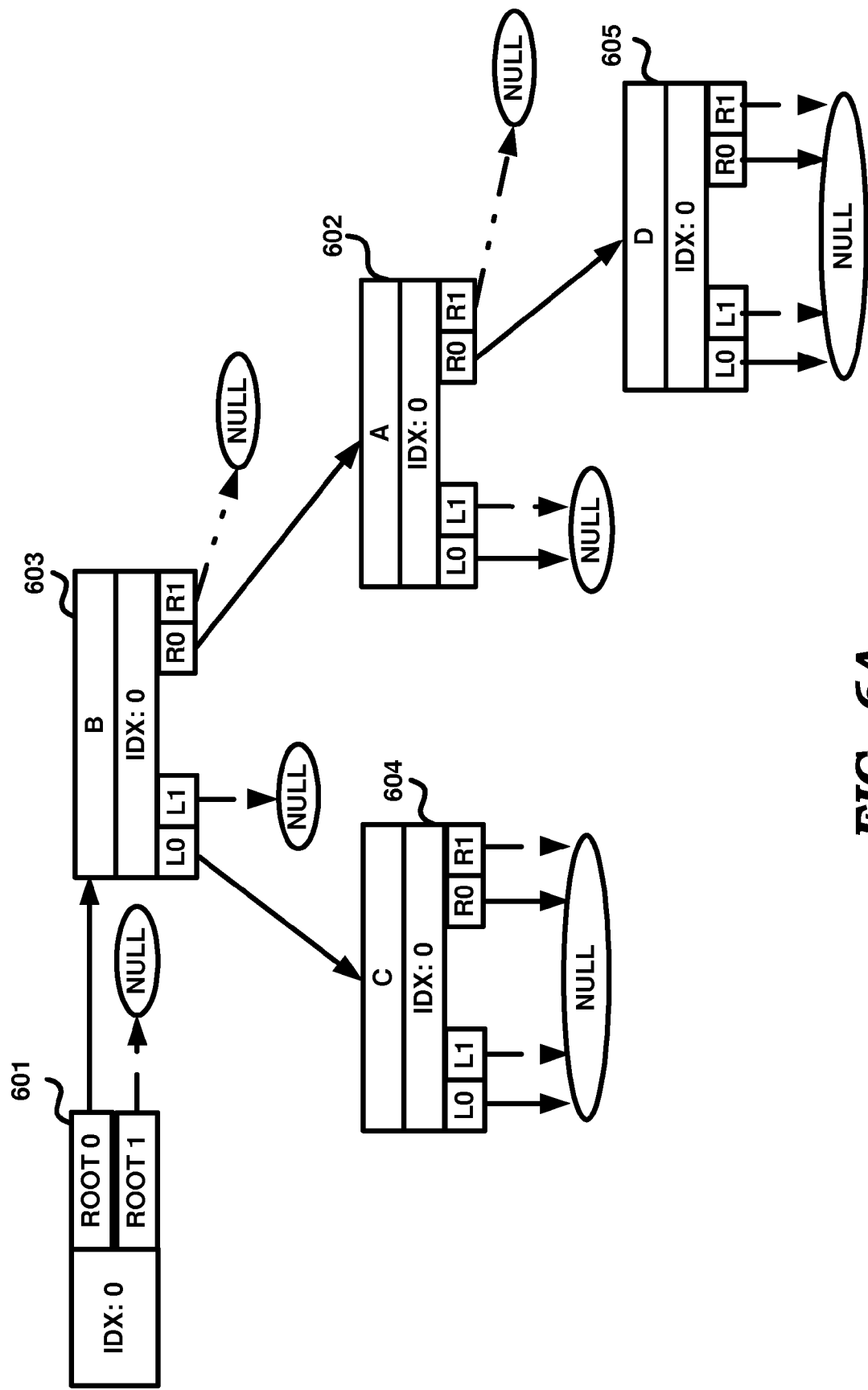
FIGS. 6A-6I depict the status of a (AVL) tree as a node is deleted, according to an aspect of the present disclosure.

FIG. 6A depicts the status of a tree at time instance t21. There is shown root pointer 601 and a tree with nodes 602-605. The nodes 602-605 are assumed to be storing keys/values A, B, C and D, having a relation such that C<B<A<D (wherein '<' represents the less than logical operation). It is assumed that node 604 (storing C) needs to be deleted. Nodes 602-605 are respectively referred to as nodes A, B, C, and D, where convenient.

Figure 6B:
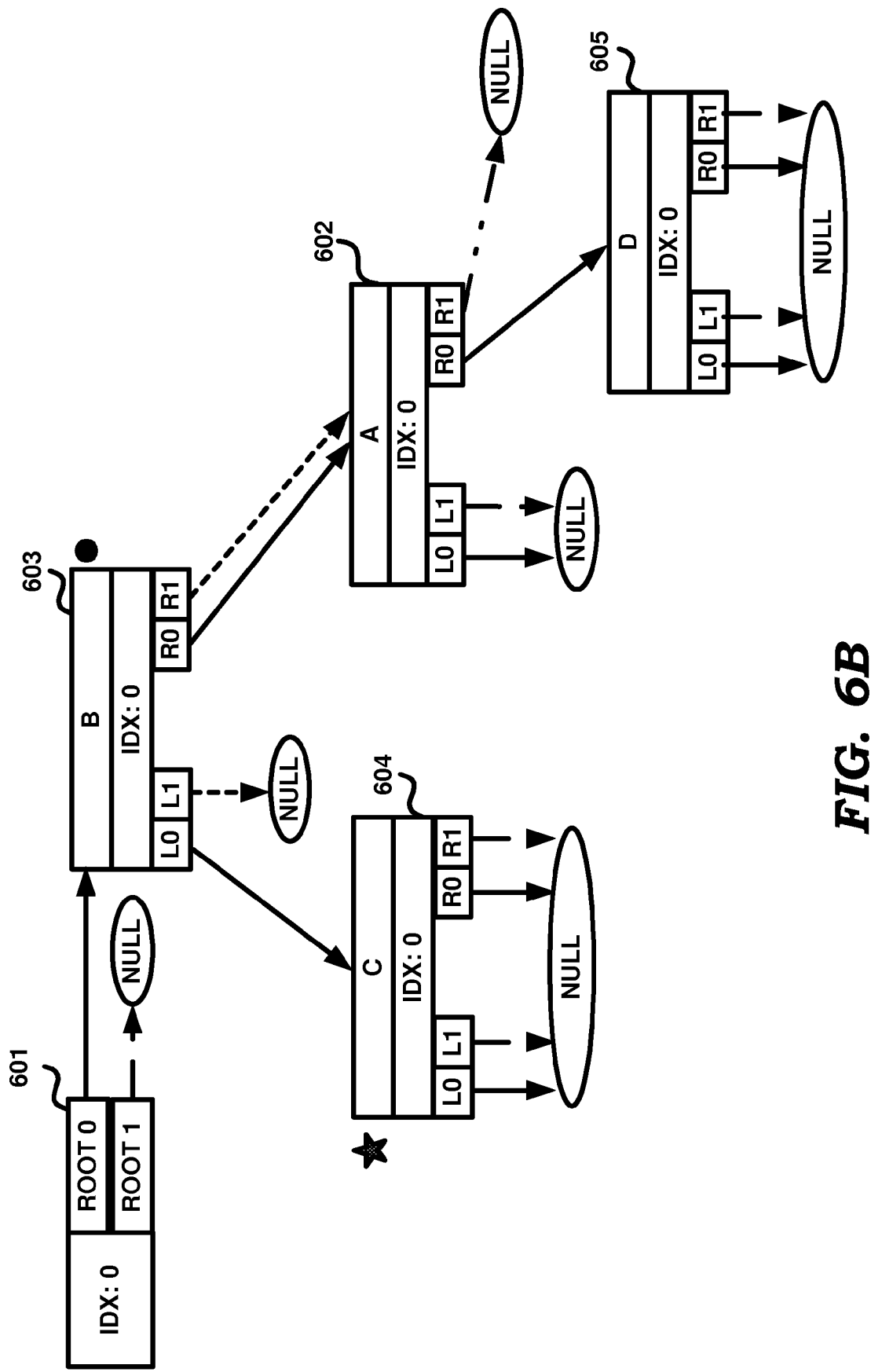

FIG. 6B depicts the status of the tree at time instance t22, with some of the tasks related to delete operation being shown to have been performed. Node C (604) is marked as 'to be deleted' (shown as star). The alternate left pointer field of B node is made NULL, and the alternate right pointer field of node B is made to point to the same node (602) as pointed by the current right pointer field. The node B is marked as 'to be flipped' (shown as dark circle), indicating that this is a node whose index field (IDX) needs to be flipped later for completing the delete operation.

Examination of the tree of FIG. 6B reveals that a balancing operation would be required at node B upon deletion of node C. The manner in which the balancing is performed, is described below in further detail.

Figure 6C:
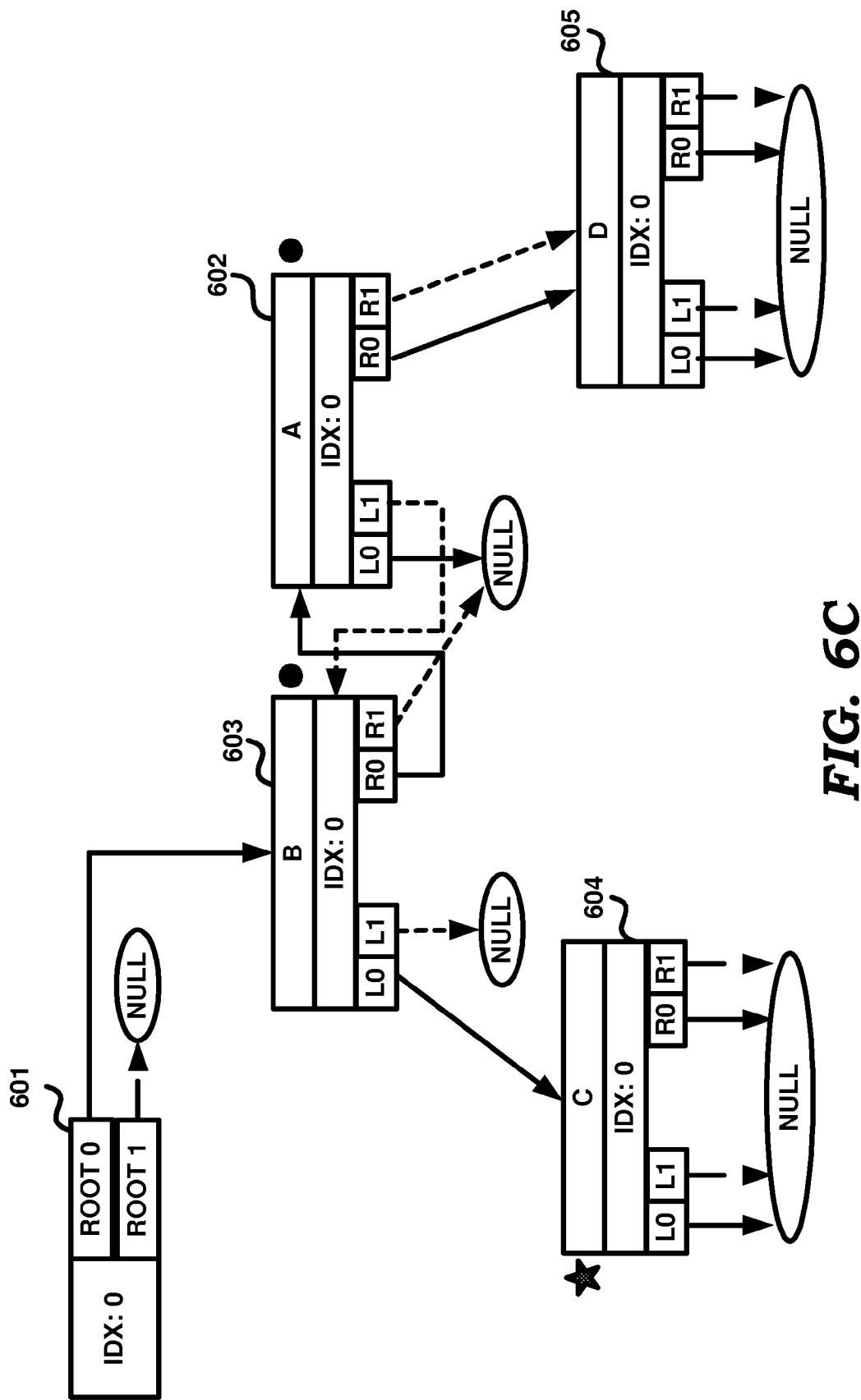

FIG. 6C depicts start of the balance operation involving nodes B and A, using their alternate pointer fields and an AVL rotation. Node A is also marked as a node 'to be flipped' since its alternate pointer fields are used to balance the tree and its IDX field needs to be flipped at a later stage (as described below).

Figure 6D:
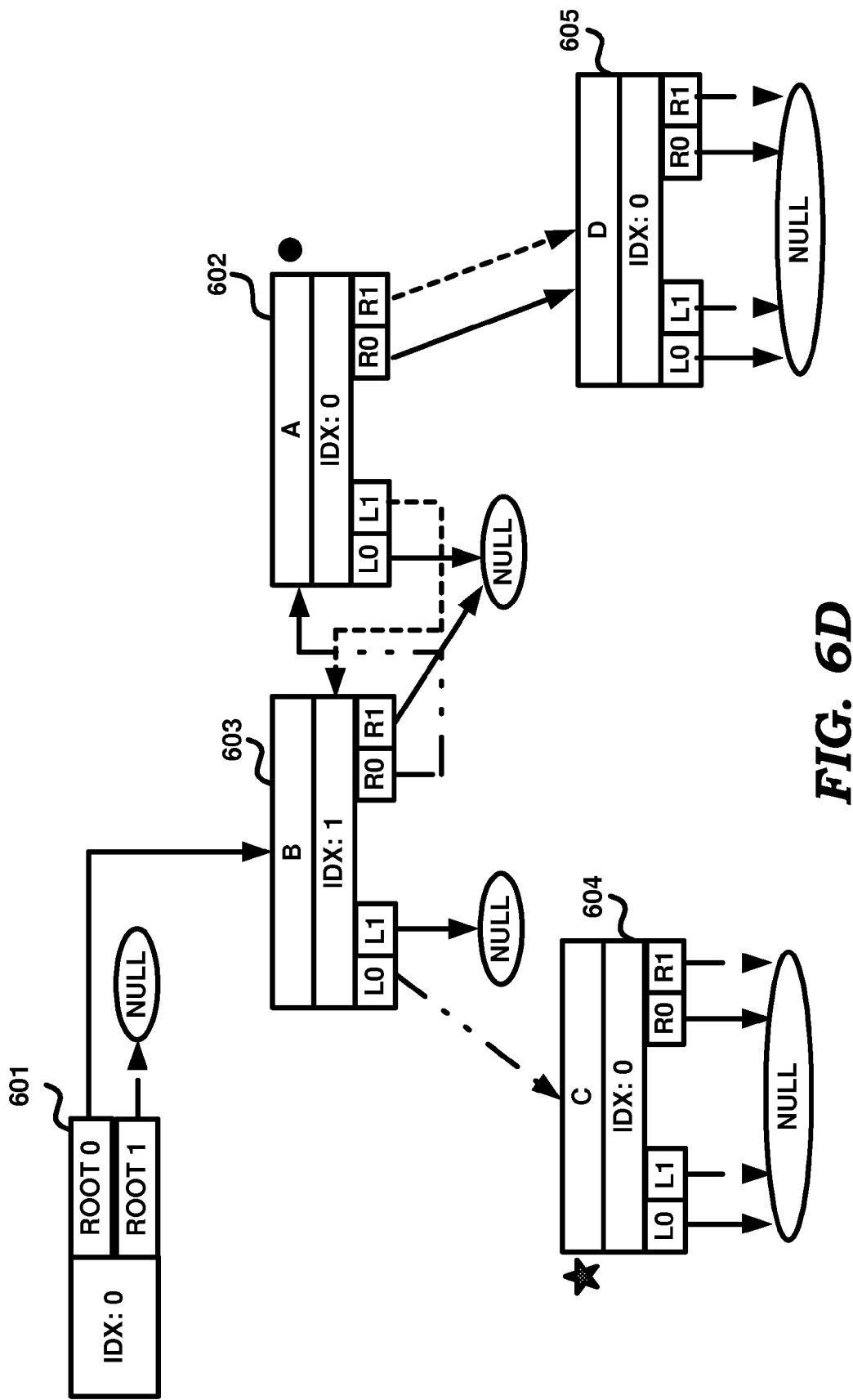

FIG. 6D depicts the IDX field of node B flipped (i.e., having been changed from 0 to 1), and performance of a traversal operation at this stage will not be able to find nodes A, C and D. Node B is unmarked (absence of dark circle), reflecting the completion of the flip operation.

Figure 6E:
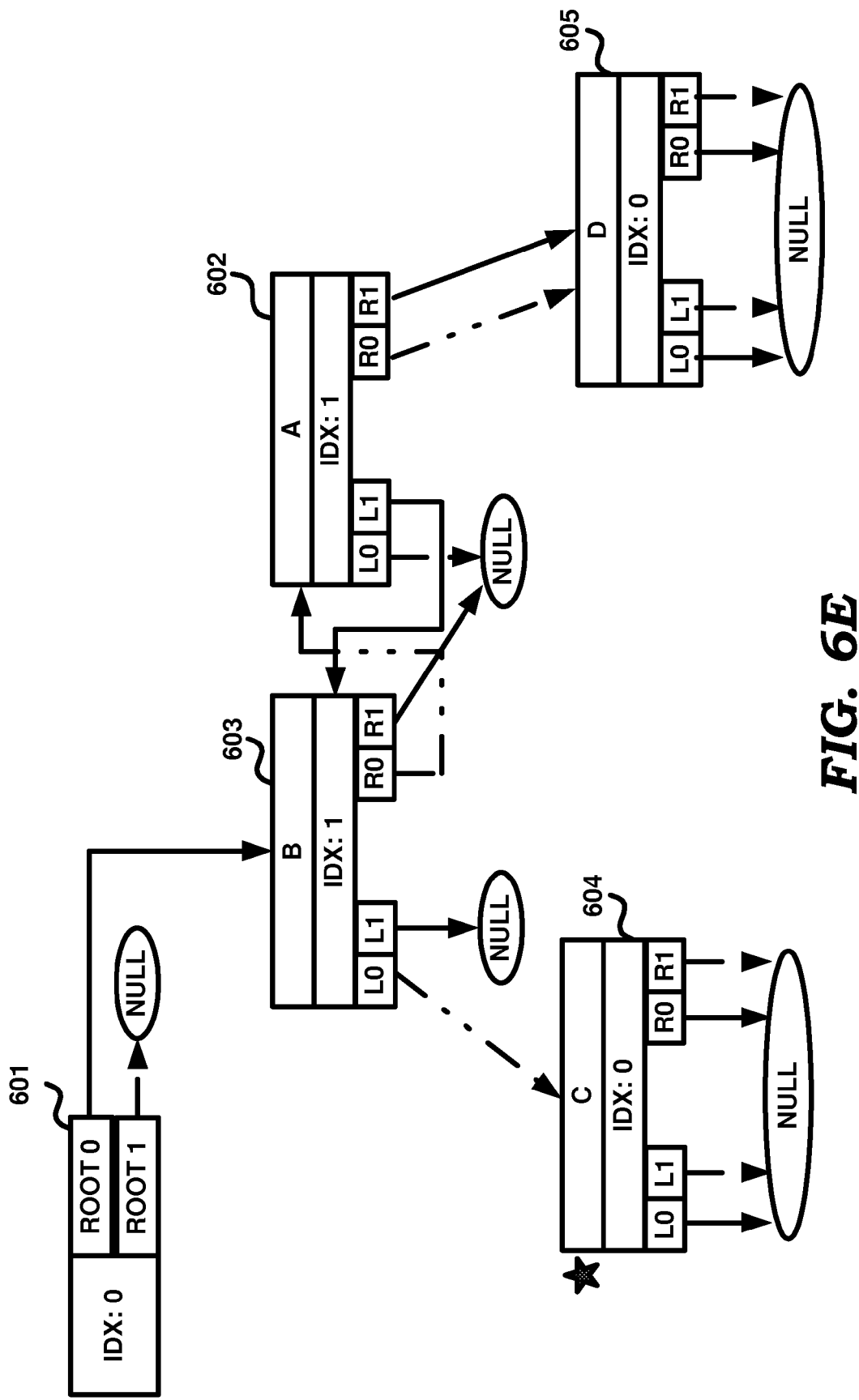
Figure 6F:
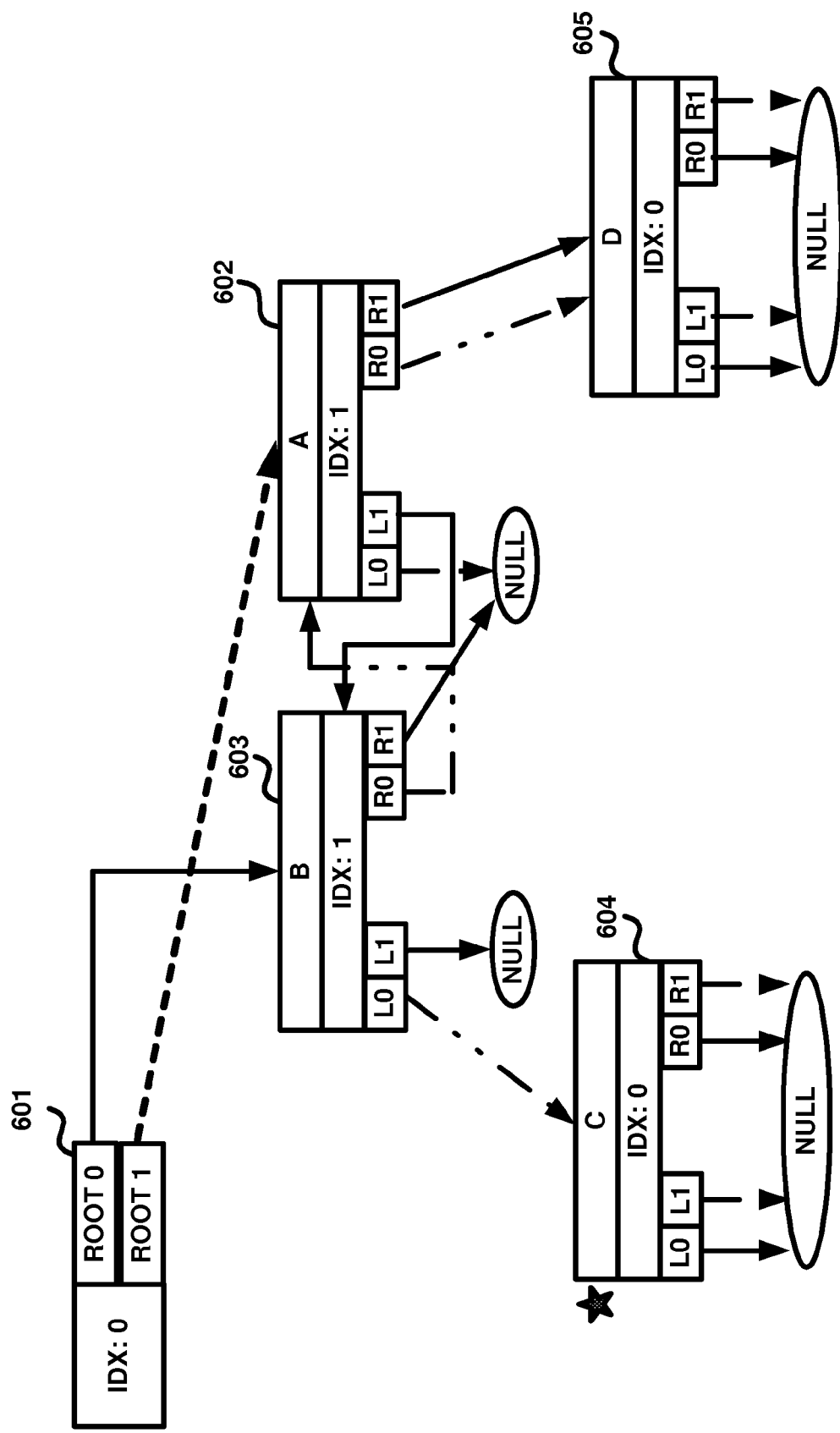

Then, as shown in FIG. 6E, the index of node A is flipped from 0 to 1. At this stage again, any traversal operation will not be able to find nodes A, C and D. In FIG. 6F, it is shown that the alternate root pointer field (root 1 of root pointer 601) is changed to point to the new root of the tree after balancing, i.e., node A. However, such pointer change could have been effected before the start of flipping shown in FIG. 6D.

Figure 6G:
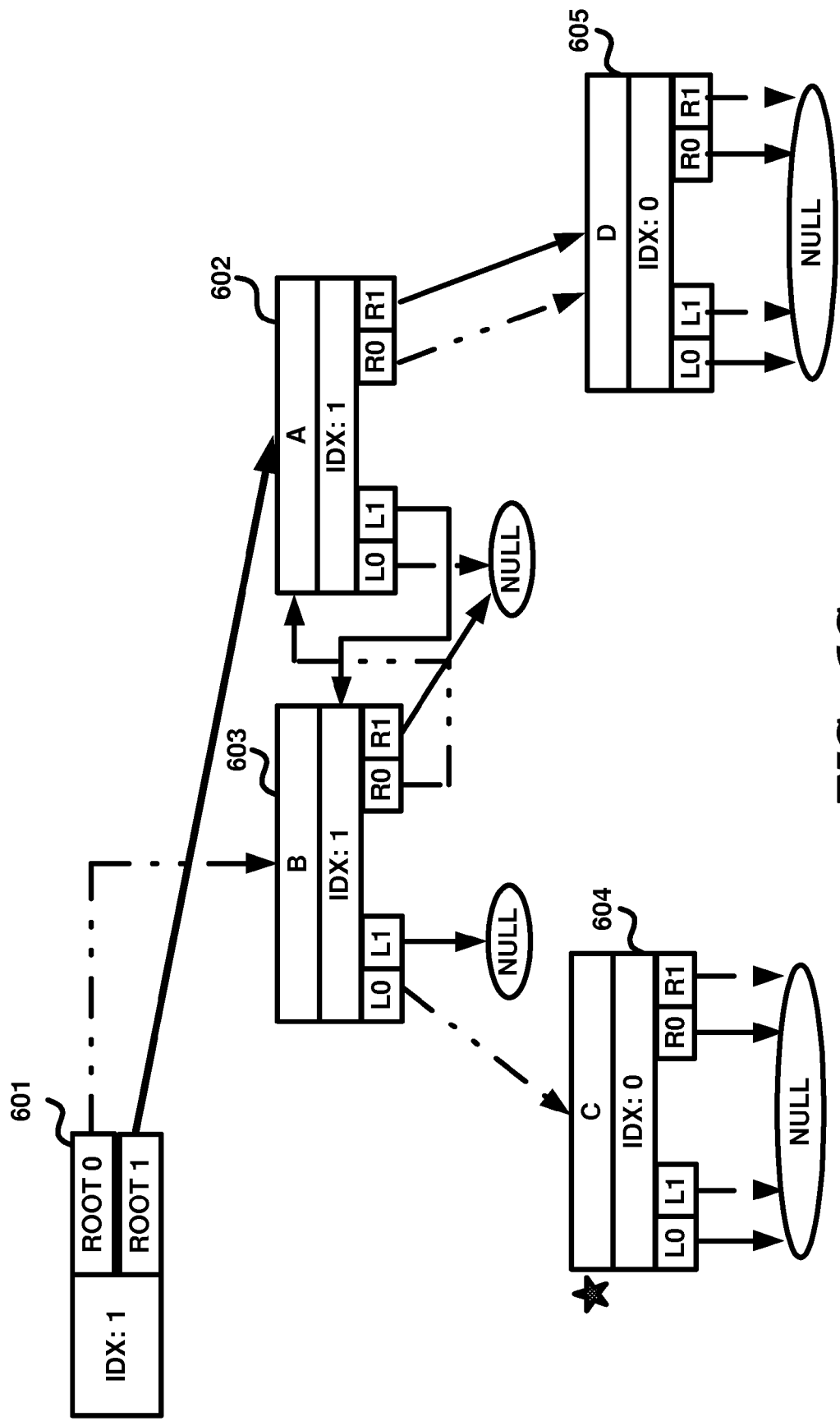
Figure 6H:
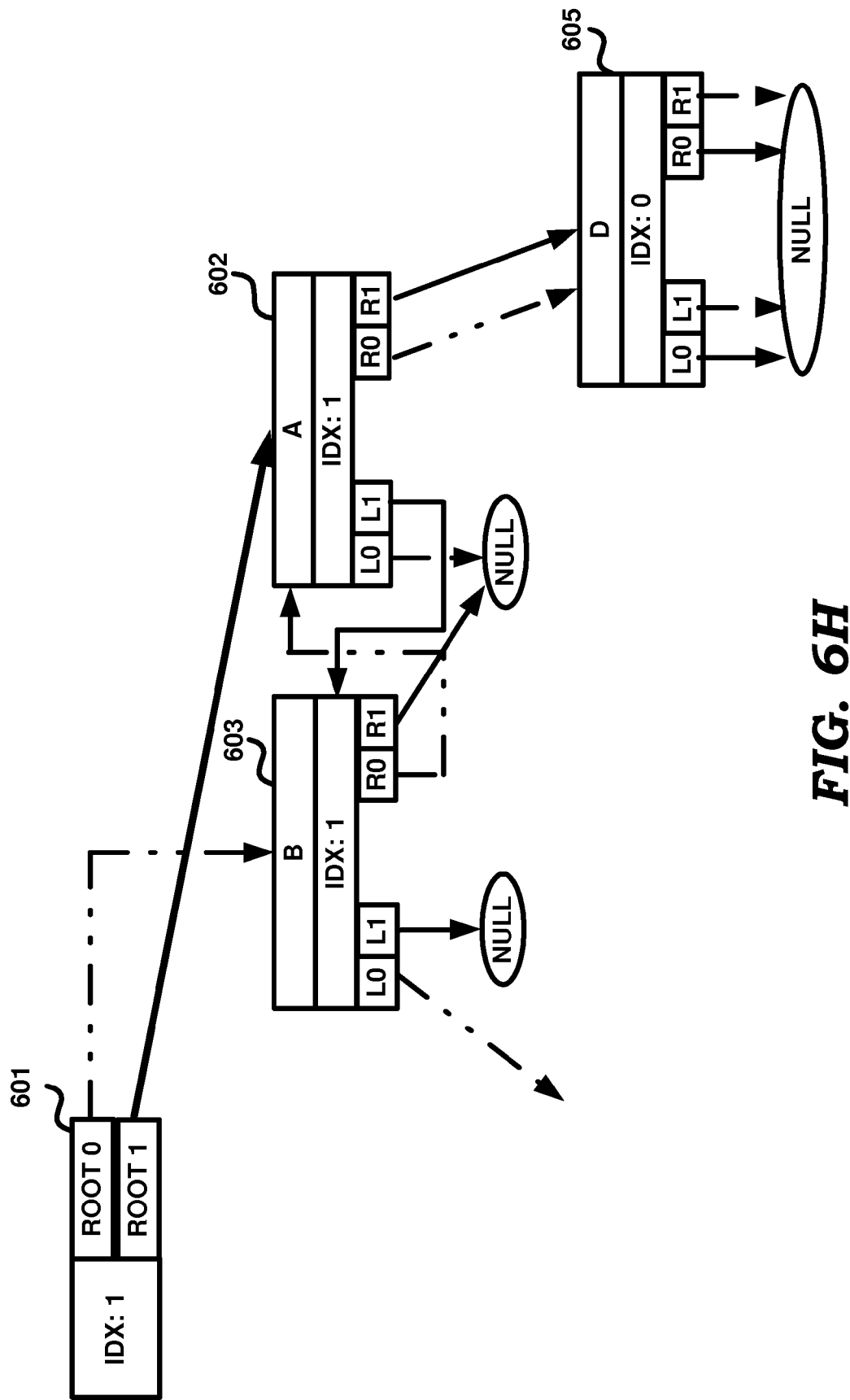
Figure 6I:
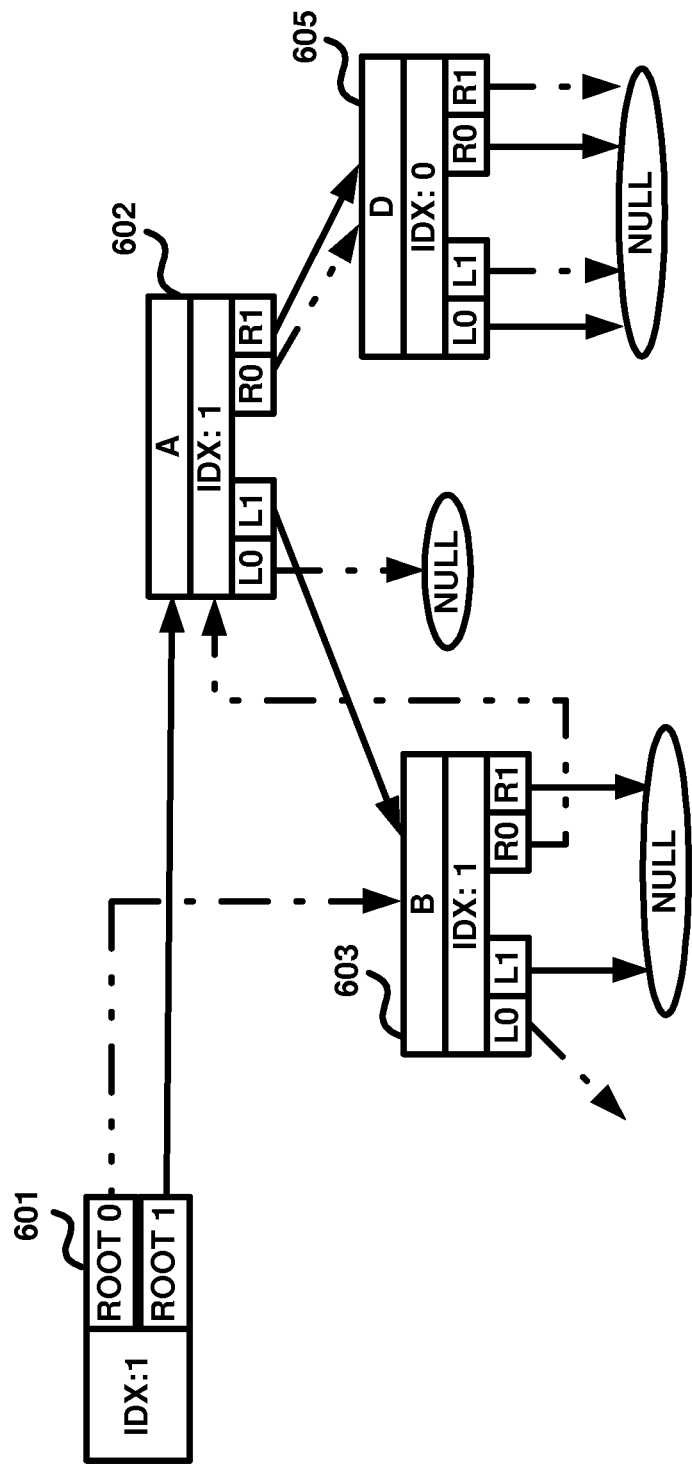

FIG. 6G depicts completion of flipping of IDX field of root pointer 601. The flipping brings into effect the visibility of node A for traversal operations, and from node A, both nodes B and C are now accessible. FIG. 6H depicts the physical deletion of the node, where the memory (e.g., RAM of FIG. 1) representing node C is freed after a grace/predetermined period and it is not accessible even using the alternate left pointer field of node B. FIG. 6I is the same as the FIG. 6H, but with a better view depicting that A is the new root node, B and D are its left and right child nodes respectively.

9. Deletion Operations in General

Figures 7, 8:
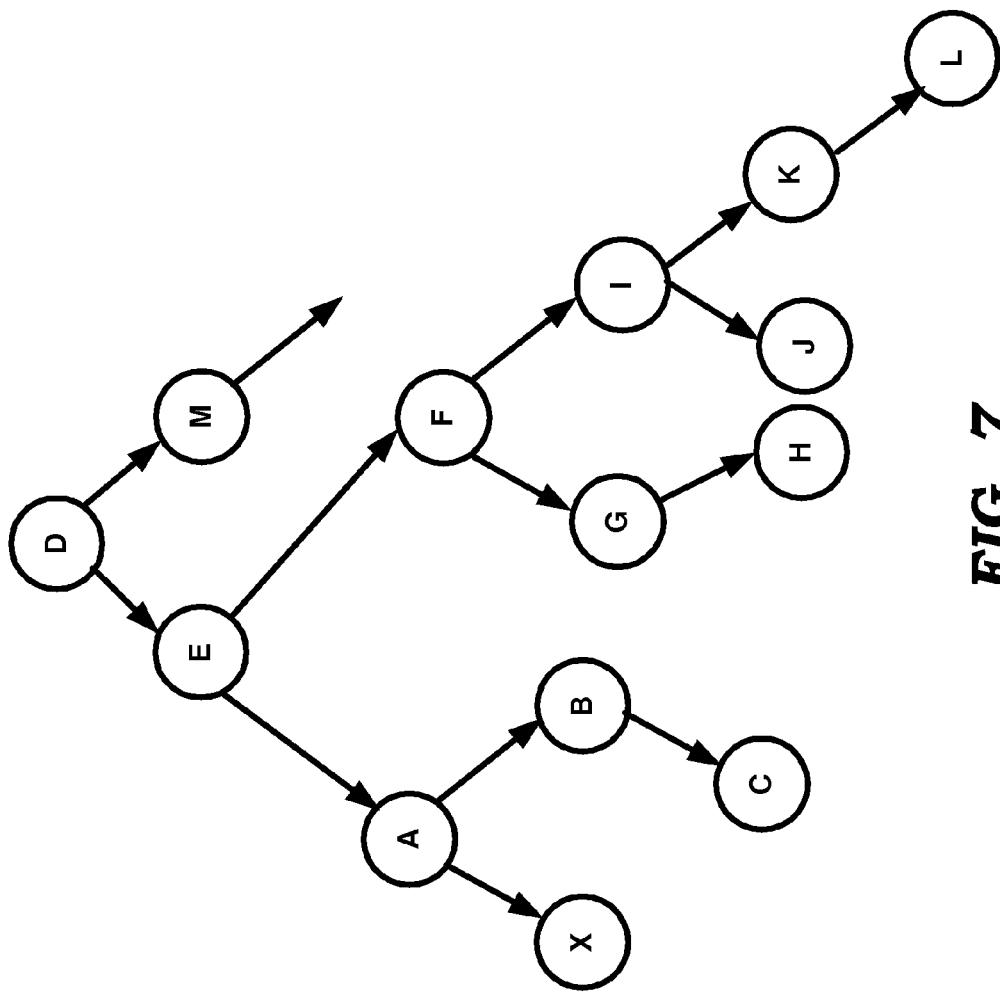
FIG. 7 depicts portions of a balanced AVL tree in an embodiment.
FIG. 8 illustrates the manner in which a balanced AVL tree may be obtained in an embodiment.

While FIGS. 6A-6H illustrate a simple case of deletion, the deletion operation may be viewed as having four different aspects (1) identifying an appropriate replacement node, while preserving the AVL structure; (2) forming a replacement resulting in a (balanced or unbalanced) tree satisfying the binary logic constraints; (3) performing any required balancing operations; and (4) performing a flipping operation that brings a new topology into effect. These aspects are described in relation to the tree of FIG. 7 at a general level only to avoid obfuscation of the inventive features of the present disclosure. It may be readily appreciated that only a part of the AVL tree is shown in FIG. 7.

Aspects 2 and 3 entail manipulation of the pair of fields (including the alternate pointer) for each node pointer. The alternate pointers of a set of nodes may be set to correspond to the topology effecting aspects 2 and 3. Aspect 4 entails 'flipping' the IDX field of each of the set of nodes to obtain a balanced AVL tree, as described below. Aspect 4 is represented by the algorithm in FIG. 8.

In the present description, we assume N to be the node which is deleted, and P be its parent node. If N has two children, we choose a replacement node RN, which can be either be the in order predecessor (the node in the left sub-tree having largest value less than the value of N) or in-order successor (the node in the right sub-tree having smallest value greater than the value of N) of node N. For example in FIG. 7, for node F, node H and node J are the respective in-order predecessor and in-order successor respectively.

Thus, RN is always a node which can have only (at most) 1 child, but can be removed from N by several levels depending on the depth of the sub-tree. Let RNP be the parent of node RN. For example in FIG. 7, if node F is being deleted and node J is chosen as the replacement node, node I represents the node RNP. However, node I can be several nodes away in the tree hierarchy. The alternate pointers of node RN are used to add links to node N's children, and we attach node RN to the alternate pointers of node P (i.e., the alternate pointer of node P is made to point to node RN). As noted above, all the nodes, for which the alternate pointer is used, are marked for later flipping.

Thus, at the end of aspect 2 as described above, the view of the tree, considering the alternate pointers of nodes marked for later flipping and the current pointer of the remaining non-deleted nodes, represents an intermediate view, which may not be balanced. A delete operation may or may not cause an imbalance in the tree. It is well known that after a delete operation, if the tree is not balanced, then multiple balance operations may be required to balance the whole tree. For example, if node X is deleted, several balancing operations (at nodes A, E and D in FIG. 7) may be required. The principles of such balancing is described briefly below.

Broadly, we identify a start node (S) from which to traverse upward, while examining any imbalances at the corresponding nodes. The start node S is selected as RNP (parent of replacement node RN) in case node N has 2 children, and as node P (parent of N) otherwise. The start node S represents the node at the lowest level at which the balance factor may have become −2 or +2 (i.e., outside of the acceptable range of +1, 0, −1). Starting from node S, the nodes are traversed upwards until an imbalanced node (X) is found (or a balanced root is reached/obtained, in which case the traversal is stopped).

To do the balance operation, start from node S and use the regular AVL tree balance algorithm for delete case to identify unbalanced nodes. Upon finding an unbalanced node, perform balancing by means of rotations using only the alternate pointers for all nodes involved in the rotation operation. Mark the nodes involved in the rotation as "flip needed". After aspect 3 is realised where a balanced view based on the alternate pointers of the nodes affected by the balance operation(s) is obtained. It is accordingly necessary to flip the IDX field of such pointers in order to bring the balance into effect, according to aspect 4.

10. Flipping Nodes for Delete Operations

Broadly, the flipping of the nodes (by the execution entity currently implementing changes) follows the balancing operation and starts the traversal from the start node S. It is noted that while traversing upwards from the node S, at any node, if a single or a double rotation happens, the nodes affected by that rotation(s) cannot be at a lower position than the child of the root of the new tree after balancing. In other words, only the child nodes of each traversed node may be required to be flipped (based on whether the child node is marked or not). The above conditions lead to the following algorithm to flip the indices of the required nodes after an delete operation (shown according to pseudo code):

```
START
    Node = S
    WHILE (Node != NULL):
        IF (Node is marked):
            Lch = LeftChild(Node)
            Rch = RightChild(Node)
        ELSE:
            Lch = AlternateLeftChild(Node)
            Rch = AlternateRightChild(Node)
        IF (Lch != NULL and Lch is marked):
            RemoveMark(Lch)
            Flip_index(Lch)
        IF (Rch != NULL and Rch is marked):
            RemoveMark(Rch)
            Flip_index(Rch)
        Node = Parent(Node).
    END of while
END
```

It may be noted that the flipping algorithm noted above for deletion operation provides the most efficient manner in which lockless deletion from AVL tree can be performed. However, instead of the approach of the algorithm, in an alternative embodiment, a list of all nodes requiring flipping may be maintained, and flipping may be performed using multiple execution entities operating in parallel. The list may be suitably partitioned to avoid errors, and each partition may be allocated to the corresponding execution entity for flipping. The duration of erroneous accesses is reduced, while the specific errors may be less predictable than in the serial flipping examples (of insertion and deletion) described above.

While the description is provided with respect to insertion and deletion of nodes, the values in the nodes may also be updated, as described in the co-pending application noted above. In summary, two fields may be maintained for each value and an index (similar to IDX field) may be used for updates, while providing unblocked accesses. That is, one execution entity may be permitted to perform change operations (including the rotations, etc., noted above), while multiple execution entities can perform concurrent read operations. The single execution entity may be chosen by using a writers lock, in case there are multiple execution entities able to perform write operations.

It should be appreciated that the features described above can be implemented in various embodiments as a desired combination of one or more of hardware, executable modules, and firmware. Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

11. Conclusion

While various embodiments of the present disclosure have been described above, it should be understood that they have been presented by way of example only, and not limitation. Thus, the breadth and scope of the present disclosure should not be limited by any of the above described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in relation to a tree comprising a plurality of nodes defined according to a hierarchy specified by a corresponding node pointer at each node, wherein each node pointer of a node points to a lower node to define said hierarchy, said method being performed in a digital processing system, said method comprising:

maintaining, for each node of said plurality of nodes, a corresponding pair of pointer fields and an index field, wherein each index field indicates one of said pair of pointer fields as the node pointer of the node;

performing a change operation in a first execution entity, and a traversal operation in a second execution entity, wherein said first execution entity and said second execution entity are executed concurrently in said digital processing system, said change operation requiring modification of the node pointer of a first node and said traversal operation being designed to traverse a sequence of nodes including said first node of said tree, wherein said traversal operation comprises accessing each node in said sequence based on the specific one of said pair of pointer fields indicated by the corresponding index fields of the node, wherein said change operation is performed using the other one of said pair of pointer fields not indicated by said index field of said first node; and permitting non-blocking access of said first node to both of said first execution entity and said second execution entity, thereby enabling said change operation and said traversal operation to be performed concurrently.

2. The method of claim 1, further comprising setting the index field of said first node to indicate that said other one of said pair of pointer fields as the node pointer for said first node upon completion of said change operation such that the change is effective for subsequent traversal operations.

3. The method of claim 1, wherein said change operation requires a change to a topology of said tree, said method further comprising:

updating the other pointer fields indicated by the corresponding index fields as not being node pointers to represent the changed topology;

setting the index fields for each of the updated other pointer fields to indicate that the other pointer fields thereafter represent respective node pointers; and performing unblocked traversal of said tree using the pointer fields indicated by the corresponding index fields as being node pointers even while changing said topology.

4. The method of claim 1, wherein said tree is an AVL (Adelson, Velskii and Landis) tree and said change of said topology is required for balancing of said AVL tree as a part of said change operation.

5. The method of claim 4, wherein said change operation is one of an insert operation of a fourth node as a child node of said first node into said AVL tree, a delete operation of a second node of said AVL tree and an update operation of a third node of said AVL tree.

6. A non-transitory machine readable medium storing one or more sequences of instructions for enabling a system to perform operations in related to a tree comprising a plurality of nodes defined according to a hierarchy specified by a corresponding node pointer at each node, wherein each node pointer of a node points to a lower node to define said hierarchy, wherein execution of said one or more instructions by one or more processors contained in said system enables said system to perform the actions of:

maintaining, for each node of said plurality of nodes, a corresponding pair of pointer fields and an index field, wherein each index field indicates one of said pair of pointer fields as the node pointer of the node;

performing a change operation in a first execution entity, and a traversal operation in a second execution entity, wherein said first execution entity and said second execution entity are executed concurrently in said digital processing system, said change operation requiring modification of the node pointer of a first node and said traversal operation being designed to traverse a sequence of nodes including said first node of said tree, wherein said traversal operation comprises accessing each node in said sequence based on the specific one of said pair of pointer fields indicated by the corresponding index fields of the node, wherein said change operation is performed using the other one of said pair of pointer fields not indicated by said index field of said first node;

permitting non-blocking access of said first node to both of said first execution entity and said second execution entity, thereby enabling said change operation and said traversal operation to be performed concurrently.

7. The machine readable medium of claim 6, further comprising one or more instructions for setting the index field of said first node to indicate that said other one of said pair of pointer fields as the node pointer for said first node upon completion of said change operation such that the change is effective for subsequent traversal operations.

8. The machine readable medium of claim 7, wherein said change operation requires a change to a topology of said tree, further comprising one or more instructions for:
updating the other pointer fields indicated by the corresponding index fields as not being node pointers to represent the changed topology;
setting the index fields for each of the updated other pointer fields to indicate that the other pointer fields thereafter represent respective node pointers; and
performing unblocked traversal of said tree using the pointer fields indicated by the corresponding index fields as being node pointers even while changing said topology.

9. The machine readable medium of claim 6, wherein said tree is an AVL (Adelson, Velskii and Landis) tree and said change of said topology is required for balancing of said AVL tree as a part of said change operation.

10. The machine readable medium of claim 9, wherein said change operation is one of an insert operation of a fourth node as a child node of said first node into said AVL tree, a delete operation of a second node of said AVL tree and an update operation of a third node of said AVL tree.

11. A digital processing system comprising:
a processor;
a random access memory (RAM);
a machine readable medium to store one or more instructions, which when retrieved into said RAM and executed by said processor causes said digital processing system to perform operations in relation to a tree comprising a plurality of nodes defined according to a hierarchy specified by a corresponding node pointer at each node, wherein each node pointer of a node points to a lower node to define said hierarchy, said digital processing system performing the actions of:
maintaining, for each node of said plurality of nodes, a corresponding pair of pointer fields and an index field, wherein each index field indicates one of said pair of pointer fields as the node pointer of the node;
performing a change operation in a first execution entity, and a traversal operation in a second execution entity, wherein said first execution entity and said second execution entity are executed concurrently in said digital processing system,
said change operation requiring modification of the node pointer of a first node and said traversal operation being designed to traverse a sequence of nodes including said first node of said tree,
wherein said traversal operation comprises accessing each node in said sequence based on the specific one of said pair of pointer fields indicated by the corresponding index fields of the node,
wherein said change operation is performed using the other one of said pair of pointer fields not indicated by said index field of said first node; and
permitting non-blocking access of said first node to both of said first execution entity and said second execution entity, thereby enabling said change operation and said traversal operation to be performed concurrently.

12. The digital processing system of claim 11, further performing the actions of setting the index field of said first node to indicate that said other one of said pair of pointer fields as the node pointer for said first node upon completion of said change operation such that the change is effective for subsequent traversal operations.

13. The digital processing system of claim 12, wherein said change operation requires a change to a topology of said tree, further performing the actions of:
updating the other pointer fields indicated by the corresponding index fields as not being node pointers to represent the changed topology;
setting the index fields for each of the updated other pointer fields to indicate that the other pointer fields thereafter represent respective node pointers; and
performing unblocked traversal of said tree using the pointer fields indicated by the corresponding index fields as being node pointers even while changing said topology.

14. The digital processing system of claim 11, wherein said tree is an AVL (Adelson, Velskii and Landis) tree and said change of said topology is required for balancing of said AVL tree as a part of said change operation,
wherein said change operation is one of an insert operation of a fourth node as a child node of said first node into said AVL tree, a delete operation of a second node of said AVL tree and an update operation of a third node of said AVL tree.

* * * * *

UNITED STATES PATENT AND TRADEMARK OFFICE
CERTIFICATE OF CORRECTION

| | | |
|---|---|---|
| PATENT NO. | : 9,588,985 B2 | Page 1 of 1 |
| APPLICATION NO. | : 14/246159 | |
| DATED | : March 7, 2017 | |
| INVENTOR(S) | : Narasimhamurthy et al. | |

It is certified that error appears in the above-identified patent and that said Letters Patent is hereby corrected as shown below:

In the Specification

In Column 11, Line 29, delete "occured," and insert -- occurred, --, therefor.

In Column 11, Line 30, delete "occured" and insert -- occurred --, therefor.

In Column 11, Line 57, delete "show n" and insert -- shown --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*